US012257749B2

(12) United States Patent
Rostamimouri et al.

(10) Patent No.: US 12,257,749 B2
(45) Date of Patent: Mar. 25, 2025

(54) INJECTION UNIT WITH TELESCOPIC MELT COUPLING

(71) Applicant: HUSKY INJECTION MOLDING SYSTEMS LTD., Bolton (CA)

(72) Inventors: Arash Rostamimouri, Newmarket (CA); Alex Teng, Richmond Hill (CA); Harshan Pugazhenthy, Brampton (CA)

(73) Assignee: Husky Injection Molding Systems Ltd., Bolton (CA)

(*) Notice: Subject to any disclaimer, the term of this patent is extended or adjusted under 35 U.S.C. 154(b) by 215 days.

(21) Appl. No.: 18/245,375

(22) PCT Filed: Aug. 27, 2021

(86) PCT No.: PCT/CA2021/051190
§ 371 (c)(1),
(2) Date: Mar. 15, 2023

(87) PCT Pub. No.: WO2022/056618
PCT Pub. Date: Mar. 24, 2022

(65) Prior Publication Data
US 2023/0286196 A1 Sep. 14, 2023

Related U.S. Application Data

(60) Provisional application No. 63/079,540, filed on Sep. 17, 2020.

(51) Int. Cl.
*B29C 45/20* (2006.01)
*B29C 45/17* (2006.01)
(52) U.S. Cl.
CPC .......... *B29C 45/1773* (2013.01); *B29C 45/20* (2013.01); *B29C 2045/202* (2013.01)

(58) Field of Classification Search
None
See application file for complete search history.

(56) References Cited

U.S. PATENT DOCUMENTS 3,843,757 A 10/1974 Ehrenfreund et al.
4,595,546 A 6/1986 Wheeler, Jr.
(Continued)

FOREIGN PATENT DOCUMENTS

CA 2033493 A1 9/1991
CN 1478014 A 2/2004
(Continued)

OTHER PUBLICATIONS

Extended European Search Report for European Application No. 21867972.8, dated Nov. 12, 2024.
(Continued)

*Primary Examiner* — Yung-Sheng M Tsui
(74) *Attorney, Agent, or Firm* — Wolf, Greenfield & Sacks, P.C.

(57) ABSTRACT

In one aspect, an injection unit for an injection molding machine having a hot runner with a sprue comprises a heated melt pipe configured to convey a continuous stream of melt, a shooting pot assembly, and a telescopic melt coupling. The shooting pot assembly is configured to convert the continuous stream of melt from the heated melt pipe into batches for cyclical injection and is translatable between a sprue-engagement position and a sprue-disengagement position. The telescopic melt coupling is configured to convey melt from the heated melt pipe to the shooting pot assembly and has a variable length. The variable length telescopic melt coupling permits translation of the shooting pot assembly, relative to the heated melt pipe, between the sprue-engagement position and the sprue-disengagement position while maintain- (Continued)

ing a fluid melt interconnection between the heated melt pipe and the shooting pot assembly.

19 Claims, 24 Drawing Sheets

(56) References Cited

U.S. PATENT DOCUMENTS

| | | |
|---|---|---|
| 5,403,178 A | 4/1995 | Steger |
| 5,422,049 A | 6/1995 | Kruger et al. |
| 5,928,596 A | 7/1999 | McLeod et al. |
| 5,945,460 A | 8/1999 | Ekart et al. |
| 6,071,462 A | 6/2000 | Putsch |
| 6,241,508 B1 | 6/2001 | John et al. |
| 6,338,840 B1 | 1/2002 | Allan et al. |
| 6,485,666 B1 * | 11/2002 | Rowley .............. B29C 57/00 264/327 |
| 6,602,063 B1 | 8/2003 | Cardona |
| 6,730,774 B1 | 5/2004 | Christel et al. |
| 7,172,407 B2 | 2/2007 | Zimmet |
| 7,198,400 B2 | 4/2007 | Unterlander et al. |
| 7,399,442 B2 | 7/2008 | Sabin et al. |
| 7,670,537 B2 | 3/2010 | Ujma et al. |
| 7,736,565 B2 | 6/2010 | Ota |
| 9,138,916 B2 | 9/2015 | Humele et al. |
| 2001/0048170 A1 | 12/2001 | Wobbe et al. |
| 2003/0057606 A1 | 3/2003 | Brix |
| 2004/0265419 A1 | 12/2004 | Wohlrab |
| 2005/0194705 A1 | 9/2005 | Smith |
| 2006/0003046 A1 * | 1/2006 | Serniuck ............ B29C 45/02 425/564 |
| 2009/0051070 A1 | 2/2009 | Fischbach et al. |
| 2012/0098153 A1 | 4/2012 | Forsthovel |
| 2012/0179288 A1 | 7/2012 | Leung et al. |
| 2015/0251343 A1 | 9/2015 | Deardurff et al. |
| 2017/0050362 A1 | 2/2017 | Yamamoto et al. |

FOREIGN PATENT DOCUMENTS

| | | |
|---|---|---|
| CN | 106003658 A | 10/2016 |
| DE | 19505984 A1 | 8/1996 |
| EP | 402484 A1 | 12/1990 |
| EP | 1009613 A1 | 6/2000 |
| EP | 1306187 A1 | 5/2003 |
| EP | 2447033 A1 | 5/2012 |
| EP | 2447036 A1 | 5/2012 |
| EP | 3288157 A1 | 2/2018 |
| JP | 2004025465 A | 1/2004 |
| JP | 2014198422 A | 10/2014 |
| JP | 2020104500 A | 7/2020 |
| WO | 0243943 A1 | 6/2002 |
| WO | 2010144994 A1 | 12/2010 |
| WO | 2014111902 A2 | 7/2014 |
| WO | WO 2014/153676 A1 | 10/2014 |
| WO | 2017183048 A1 | 10/2017 |

OTHER PUBLICATIONS

International Search Report and Written Opinion for International Application No. PCT/CA2021/051190, mailed Nov. 1, 2021.
International Preliminary Report on Patentability for International Application No. PCT/CA2021/051190, mailed Mar. 30, 2023.
Recycling of PET, European Polymer Journal, Journal 41 (2005) 1453-1477, Firas Awaja, Dumitru Pavel.

* cited by examiner

INJECTION UNIT WITH TELESCOPIC MELT COUPLING

TECHNICAL FIELD

The present disclosure relates to injection molding, and more particularly to an injection unit with a telescopic melt coupling.

BACKGROUND

The injection unit of an injection molding machine may include an extruder and at least one shooting pot. The extruder typically comprises at least one screw that rotates within a heated barrel to convert solid molding material, such as pellets of plastic or resin, into a stream of melted molding material ("melt"). The shooting pot(s) accumulate(s) melt from the extruder and periodically inject(s) the accumulated melt into a mold via a nozzle. The nozzle is shaped and sized to connect with a sprue (e.g. a sprue bushing) of a hot runner in order to define a fluid melt connection therewith. Each injection of melt received from the shooting pot, via the nozzle and sprue, is conveyed through channels of the hot runner to a plurality of mold cavities within the mold, within which molded articles are formed.

An injection unit may be translatable between a production position and a purging position.

In the production position, the nozzle tip engages (connects with) the sprue so as to form a fluid melt connection therewith through which melt from the shooting pot is periodically injected. The term "production position" connotes the fact that, when the injection molding machine is actively producing molded articles, the injection unit is in this position.

In the purging position, the injection unit is moved away from the hot runner. The nozzle tip separates or disengages from the sprue, breaking the fluid melt connection between the injection unit and the hot runner. The separation prevents melt discharged from the injection unit nozzle from entering the hot runner. Rather, melt discharged from the nozzle may simply fall into a waste collection container to be discarded. Purging may for example be performed when the melt in the injection unit has become fouled or is likely to have degraded in some fashion. This may for example occur when the machine is idle for an extended period of time or when the temperature of the accumulated melt exceeds a threshold temperature over which undesirable melt by-products or impurities, e.g. acetaldehyde, may form.

SUMMARY

In one aspect of the present disclosure, there is provided an injection unit for an injection molding machine having a hot runner with a sprue, the injection unit comprising: a heated melt pipe configured to convey a continuous stream of melt; a shooting pot assembly including at least one shooting pot, the shooting pot assembly configured to convert the continuous stream of melt from the heated melt pipe into batches for cyclical injection, the shooting pot assembly being translatable between a sprue-engagement position and a sprue-disengagement position; and a telescopic melt coupling configured to convey melt from the heated melt pipe to the shooting pot assembly, the telescopic melt coupling having a variable length to permit translation of the shooting pot assembly, relative to the heated melt pipe, between the sprue-engagement position and the sprue-disengagement position while maintaining a fluid melt interconnection between the heated melt pipe and the shooting pot assembly.

In some embodiments, the telescopic melt coupling comprises: a spigot; and a sleeve slidable about the spigot between an extended position and a collapsed position while maintaining a seal with the spigot to substantially contain melt.

In some embodiments, the injection unit further comprises at least one spigot heater configured to heat the spigot of the telescopic melt coupling; and at least one sleeve heater configured to heat the sleeve of the telescopic melt coupling, wherein the at least one spigot heater and the at least one sleeve heater are independently controlled.

In some embodiments, the at least one spigot heater is operable to deactivate when the sleeve of the telescopic melt coupling transitions from the extended position to the collapsed position.

In some embodiments, the injection unit further comprises a plurality of heaters for heating the heated melt pipe, wherein the plurality of heaters, the at least one spigot heater, and at least one sleeve heater are collectively operable to define a monotonically increasing temperature gradient along the heated melt pipe and the telescopic melt coupling in the downstream direction. The monotonically increasing temperature gradient may for example be linear or exponential.

In some embodiments, the at least one spigot heater comprises at least one of: a cartridge heater embedded in the spigot; and an infrared heater adjacent to the spigot.

In some embodiments, the at least one spigot heater comprises a pair of infrared heaters on opposite sides of the spigot.

In some embodiments, the at least one spigot heater comprises a plurality of cartridge heaters embedded in a wall of the spigot.

In some embodiments, the at least one spigot heater comprises both of the cartridge heater embedded in the spigot and the infrared heater adjacent to the spigot.

In some embodiments, one of the at least one cartridge heater and the at least one infrared heater acts as a primary heater of the spigot and the other of the at least one cartridge heater and the at least one infrared heater acts as a failsafe heater of the spigot configured to activate upon failure of the primary heater.

In some embodiments, the telescopic melt coupling defines a spherical connection mating face conforming to a sphere centered along an axis of the telescopic melt coupling.

In some embodiments, the spherical connection mating face is defined at an upstream end of the spigot, and the injection unit further comprises a stationary annular melt pipe coupler fluidly interconnecting the heated melt pipe with the spigot, the annular melt pipe coupler having a downstream end defining a spherical connection mating face that is complementary to the spherical connection mating face of the spigot, the two spherical connection mating faces collectively permitting angular axial misalignment of the telescopic melt coupling relative to the heated melt pipe without compromising the fluid melt interconnection.

In some embodiments, the spigot has an annular flange extending radially from its upstream end, and the injection unit further comprises a lock ring attached to the annular melt pipe coupler, the lock ring defining an annular space in which the annular flange is contained to permit limited longitudinal movement of the spigot.

In some embodiments, the injection unit further comprises a biasing element between the lock ring and the annular flange, the biasing element configured to bias the spherical connection mating face of the spigot against the spherical connection mating face of the annular melt pipe coupler.

In some embodiments, the injection unit further comprises a static mixer between the telescopic melt coupling and the shooting pot assembly.

In another aspect of the present disclosure, there is provided an injection molding machine comprising: a hot runner with a sprue; and an injection unit including: a heated melt pipe configured to convey a continuous stream of melt; a shooting pot assembly configured to convert the continuous stream of melt into batches for cyclical injection, the shooting pot assembly being translatable about the heated melt pipe between a sprue-engagement position and a sprue-disengagement position; and a telescopic melt coupling configured to convey melt from the heated melt pipe to the shooting pot assembly, the telescopic melt coupling having a variable length to permit translation of the shooting pot assembly, relative to the heated melt pipe, between the sprue-engagement position and the sprue-disengagement position while maintaining a fluid melt interconnection between the heated melt pipe and the shooting pot assembly.

In some embodiments, the telescopic melt coupling comprises a spigot and a sleeve slidable relative to the spigot between an extended position and a collapsed position while maintaining a seal with the spigot to substantially contain melt, and the injection molding machine further comprises: at least one spigot heater configured to heat the spigot of the telescopic melt coupling; at least one sleeve heater configured to heat the sleeve of the telescopic melt coupling; and a controller configured to deactivate either the at least one spigot heater or the at least one sleeve heater when the sleeve transitions from the extended position to the collapsed position.

In some embodiments, the injection molding machine further comprises a spherical connection configured to permit angular axial misalignment of the telescopic melt coupling relative to the heated melt pipe without compromising the fluid melt interconnection between the heated melt pipe and the shooting pot assembly.

Other features will become apparent from the drawings in conjunction with the following description.

DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

In this document, any use of the term "exemplary" should be understood to mean "an example of" and not necessarily to mean that the example is preferable or optimal in some way. Terms such as "downwardly," "right," and "left" may be used to describe features of some embodiments in this description but should not be understood to necessarily connote an orientation of the embodiments during manufacture or use.

Figure 1:
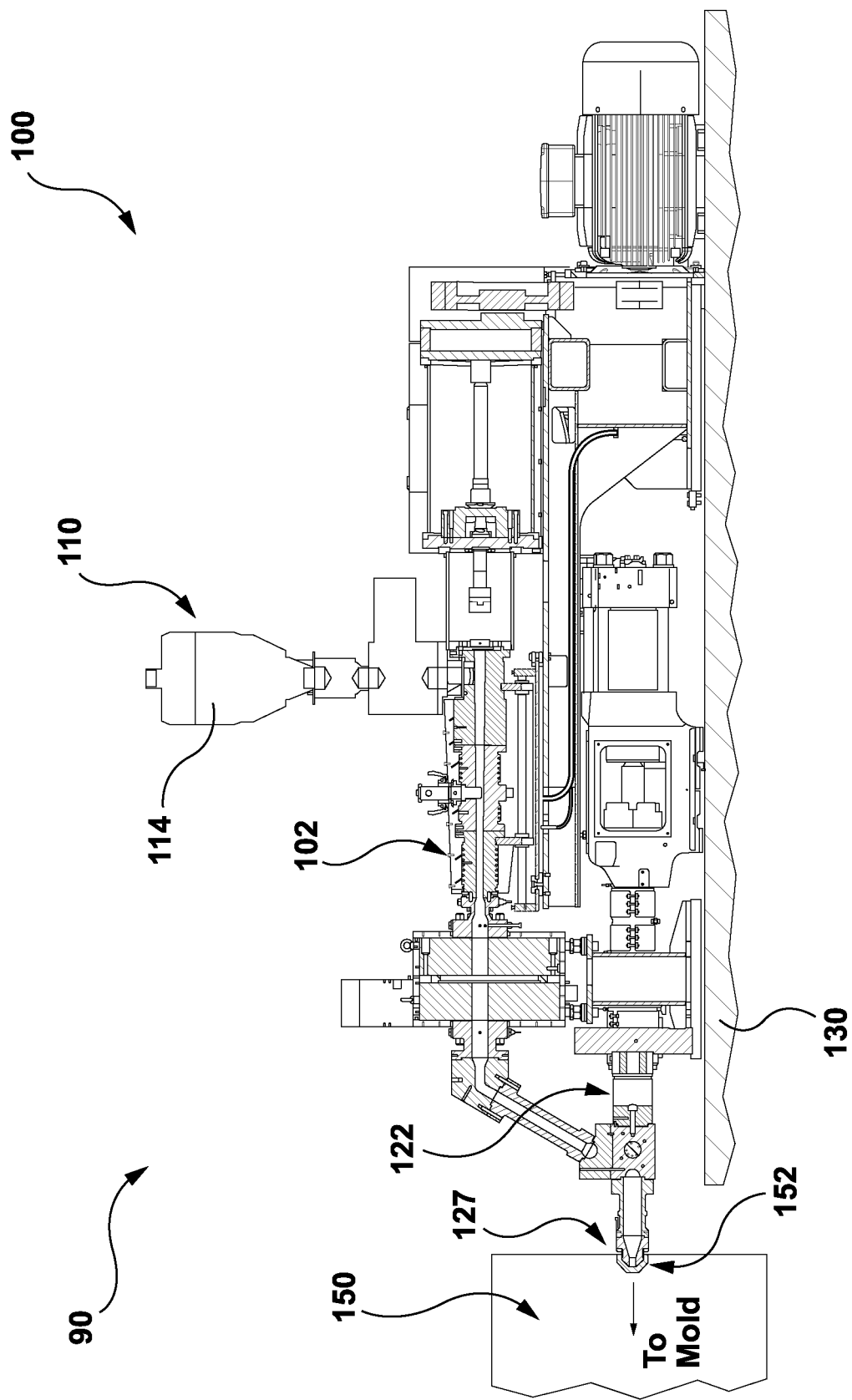
FIG. 1 depicts a partially sectioned frontal view of a conventional injection unit in a production position.

FIG. 1 depicts a partially sectioned front view of part of a conventional injection molding machine 90 comprising an injection unit 100 and a hot runner 150.

The injection unit 100 comprises an extruder 102, a material feeder 110, and a shooting pot assembly 122.

The extruder 102 is operable to receive molding material in solid (e.g. pelletized) form, plasticize the molding material into a melted form, and extrude the resultant melt in a continuous stream. The extruder includes at least one screw, housed within a heated barrel, driven by a screw actuator.

The material feeder 110 is a device that supplies the solid molding material 114 to the extruder 102. The feeder may for example be operated as a metered feeder or as a continuous feeder. The molding material 114 may be combination of virgin and recycled molding material, such as Polyethylene Terephthalate (PET) and recycled PET (rPET) for example. Alternatively, the molding material 114 may be 100% recycled molding material.

The shooting pot assembly 122 is a device that converts a continuous stream of melt from extruder 102 into batches for cyclical injection into the hot runner 150. The depicted shooting pot assembly 122 is a dual shooting pot assembly that includes two shooting pots configured to operate out of sequence with one another and associated melt conduits and valves. While one shooting pot accumulates melt from the extruder 102, the other shooting pot injects a previously accumulated "shot" of melt into the hot runner 150 via a nozzle 127 of the injection unit 100.

It will be appreciated that the position of each of the extruder 102, the material feeder 110, and the shooting pot assembly 122 of injection unit 100 is fixed relative to the others.

The injection unit 100 is slidably mounted to a fixed base 130, depicted schematically in FIG. 1. The slidable mounting permits the injection unit 100 to be translated on its base 130 towards and away from the hot runner 150 between a production position and a purging position, as will be described.

FIG. 1 further schematically depicts a portion of the hot runner 150 into which melt from injection unit 100 is periodically injected. As illustrated, hot runner 150 includes a sprue bushing 152 (a form of sprue) for receiving the tip of nozzle 127. The sprue bushing 152 is depicted schematically in FIG. 1 in cross-section. The hot runner 150 also includes distribution channels for conveying melt from the sprue towards multiple molding cavities of a mold, none of which are expressly illustrated. The hot runner 150 is fixed (does not move) relative to the base 130 of injection unit 100.

In FIG. 1, the injection molding machine 90 is depicted with the injection unit 100 in the production position. In this position, the tip of nozzle 127 engages, i.e. connects with, the sprue bushing 152 of hot runner 150. The engagement creates a fluid melt connection between the injection unit 100 and the hot runner 150 through which periodic injections of melt are conveyed into the mold's multiple cavities for the production of molded articles. This is the position of the injection unit 100 during normal operation of the injection molding machine 90.

Figure 2:
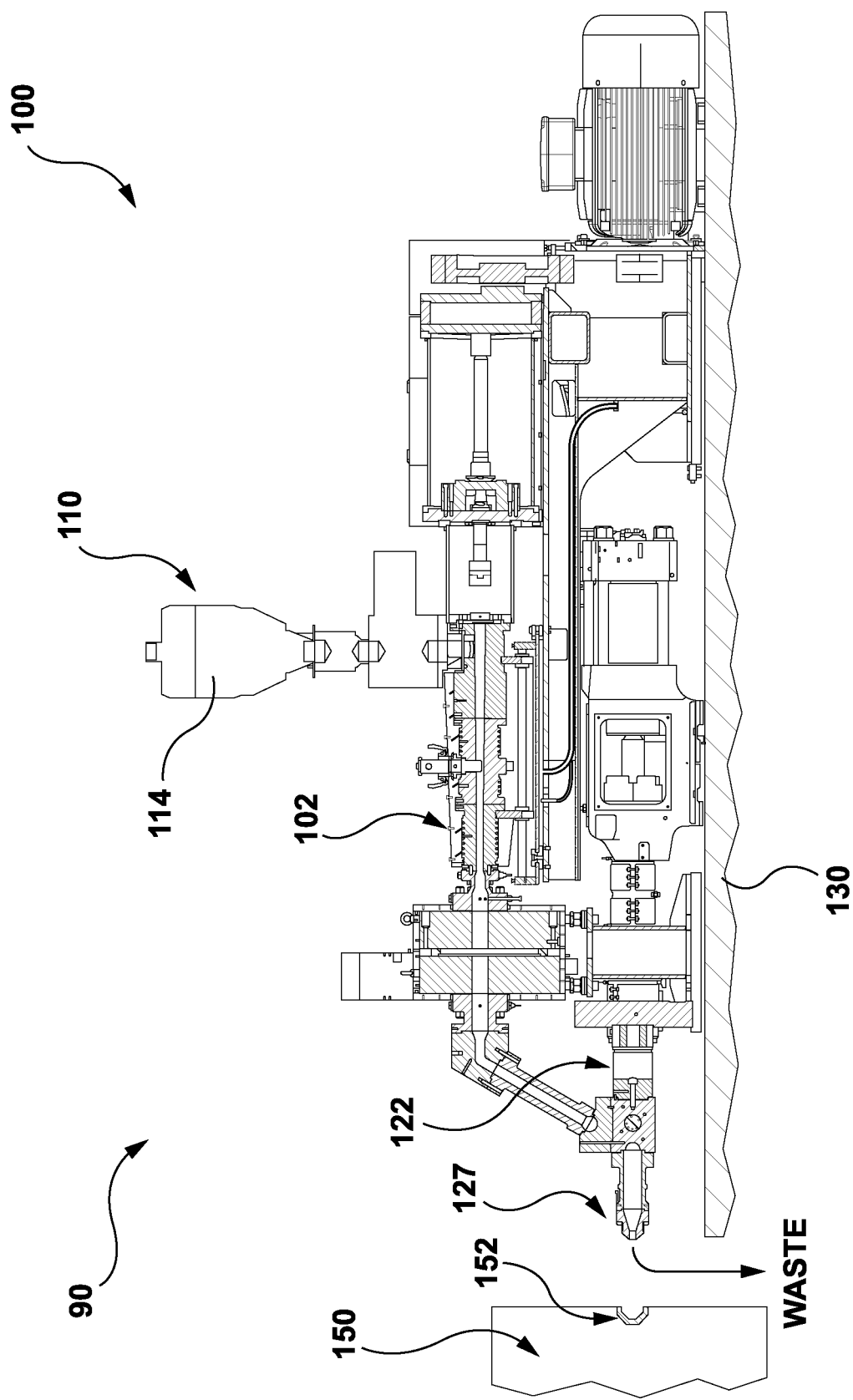
FIG. 2 depicts a partially sectioned frontal view of the conventional injection unit of FIG. 1 in a purging position.

FIG. 2 depicts the injection molding machine 90 with the injection unit 100 in the purging position. When the injection unit 100 is in this position, the nozzle 127 is separated from the sprue bushing 152. Whatever melt is discharged by the shooting pot assembly 122 with the injection unit 100 is in this position will fall downwardly to be discarded as waste. This position of the injection unit 100 may alternatively be referred to as the maintenance position because it may facilitate access to certain parts of the injection molding machine 90 (e.g. the sprue bushing 152) for routine maintenance of injection molding machine 90.

In order to move the injection unit 100 from the production position of FIG. 1 into the purging position of FIG. 2, the injection unit 100 is translated along its stationary base 130 away from the hot runner 150. It will be appreciated that, because the extruder 102, the material feeder 110, and the shooting pot assembly 122 comprising injection unit 100 are in fixed relation to one another, all of these components move together during the translation. Because the feeder 110 remains positioned to supply solid molding material 114 to extruder 102, the injection unit 100 is able continue producing and discharging melt when in the purging position.

As noted above, the pelletized material 114 in feeder 110 may include, or may be, a recycled molding material. The rationale for using recycled material may for example include one or more of the following: recycled material may be less expensive than the virgin material; recycled material may be considered eco-friendly; and use of recycled material may be favorably perceived in the marketplace.

Recycled plastic or resin molding material pellets may be produced by large, commercially available plastic recycling machines. Such machines typically input post-consumer plastic material and process the material through a series of stages to produce solid pellets of purified recycled material. The stages may include cutting, compaction, melting, degassing, filtration, and pelletizing stages. The machines may for example employ Solid State Polycondensation (SSP) or Liquid State Polycondensation (LSP) techniques. Commercially available examples of such recycling machines include, at the time of this writing, Vacurema® by Erema® and P:REACT™ systems from Next Generation Recyclingmaschinen GmbH (NGR™).

When such machines are used to produce solid pellets of recycled material for use in injection molding, the recycled material must ultimately be melted twice before being formed into a new molded article: once during recycling (in the recycling machine, as described above), and then once again when the pellets of recycled material are melted within an extruder of an injection molding machine (e.g. extruder 102) during injection molding. Each time, energy is expended to heat the material to its melting point.

To improve energy efficiency, it may be desirable to supply freshly recycled melted material to an injection molding machine as melt rather than solid pellets. This would not only avoid the need for pelletizing equipment in the recycling machine but would also eliminate the need for an extruder at the injection molding machine for melting pelletized recycled material. It is estimated that energy efficiency may be improved by approximately 30%.

However, directly supplying molten recycled material from an outboard melt provider to an injection unit of an injection molding machine may be problematic in certain respects. Machines that produce recycled melt tend to be large and heavy and may have an intricate shape. As such, it may not be readily possible to place such a recycled melt machine in close proximity to an injection molding machine, which itself may be large, heavy, and may have an incompatible shape. A recycled melt machine and the injection molding machine may therefore be separated by a significant distance. Conveying melted molding material over long distances is susceptible to problems, such as temperature variances within the conveyed melt stream and/or formation of detrimental by-products, e.g. acetaldehyde, from maintaining molten PET in a molten state, particularly at higher temperatures.

Another possible problem with connecting a direct stream of melt from an outboard melt provider, such as a separate material recycling machine, to an injection unit may be the resulting constraint on injection unit movability. As discussed above, conventional injection units supplied by integral material feeders may be configured for translatability away from and towards a hot runner for movement between production and maintenance positions. This is in part facilitated by the fact that many conventional injection units, such as injection unit 100 of FIGS. 1 and 2, have integral material feeders that are fixed in relation to the shooting pot assembly. In contrast, because a material recycling machine is likely to be stationary by virtue of its size and weight, an injection unit directly supplied by melt from such a machine would not readily be so configured.

The inventors considered various approaches for maintaining injection unit movability while maintaining a fluid connection to an upstream melt source. One approach—flexible piping—was rejected due to the irregular shaping of the interior surface of a flexible pipe, which may undesirably affect melt flow, and due to insufficient ability to withstand high melt pressures. Another approach—using multiple connecting pipes with ball-joint connections—was rejected as undesirably costly, complex, and as defining an undesirably long melt path.

Figure 3:
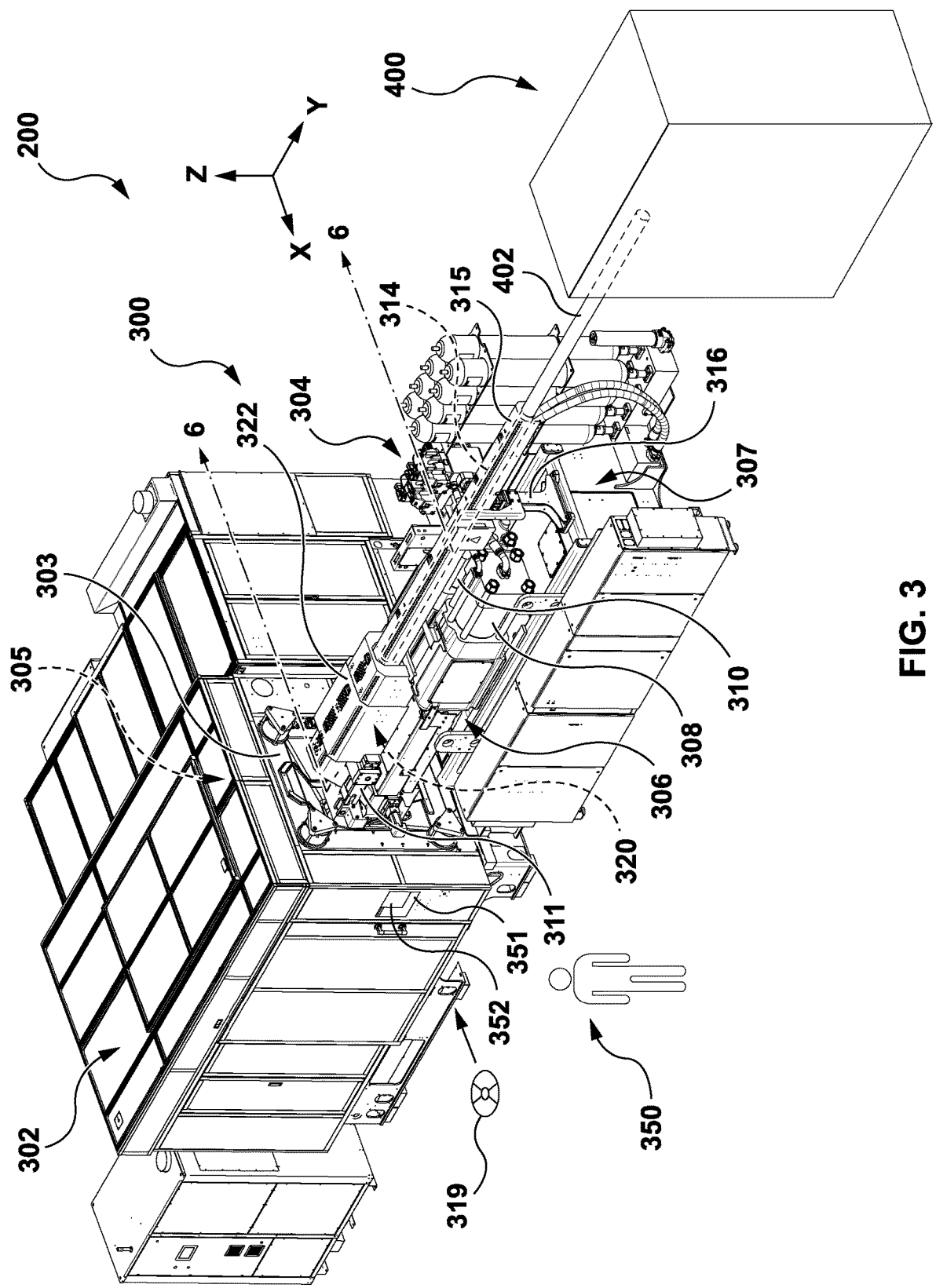
FIG. 3 is a top isometric view of an injection molding system comprising an injection molding machine and a molding material recycling machine.

FIG. 3 depicts, in isometric top view, an example injection molding system 200 that addresses at least some of the foregoing problems. The injection molding system 200 comprises an injection molding machine 300 directly supplied with melt by a stationary recycling machine 400. The injection molding machine 300 incorporates a structure that permits translation of a shooting pot assembly of an injection unit between production and maintenance positions without breaking a fluid melt connection with recycling machine 400, as will be described.

Figure 4:
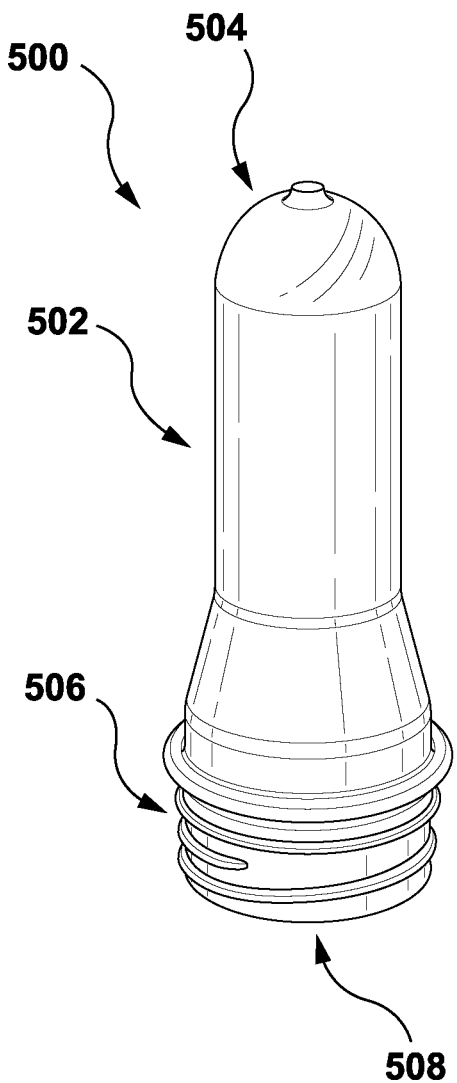
FIG. 4 is a perspective view of a molded article produced by the injection molding system of FIG. 3.

The depicted injection molding machine 300 is for injection molding preforms from a molding material such as PET. An example preform 500 that may be produced by the injection molding machine 300 is depicted in FIG. 4 in perspective view. Referring to that figure, it can be seen that the preform 500 has an elongate tubular body 502, a domed closed base 504, and a neck finish 506 defining the neck of the preform 500 near its open end 508. The preform 500 is intended to be subsequently blow-molded into a container, such as a beverage bottle, using equipment not depicted or described herein. Other embodiments may produce other types of molded articles.

Referring again to FIG. 3, it can be seen that the injection molding machine 300 comprises an enclosure 302 housing a clamp unit, a fixed platen 303, a movable platen, and a mold mounted therebetween. The enclosure 302 also houses a hot runner 305 for channeling molding material into the cavities of the mold. Of the above-listed components of injection molding machine 300, only the fixed platen 303 is visible in FIG. 3.

The injection molding machine 300 further comprises an injection unit 304. The injection unit includes a shooting pot assembly 306, a heated melt pipe 314, and a telescopic melt coupling 320, all situated atop a stationary base 307. Other components of injection unit 304 not visible in FIG. 3 will be described below.

The shooting pot assembly 306 is a dual shooting pot assembly including two shooting pots 308, 310 disposed side by side. The shooting pots 308, 310 are configured to operate out of sequence with one another: while one of the shooting pots 308 or 310 accumulates inflowing melt from recycling machine 400, the other shooting pot 310 or 308 injects a previously accumulated shot of melt into the hot runner 305 via a nozzle 325 (not visible in FIG. 3 but shown in FIG. 5, described below) of the shooting pot assembly 306. The shooting pot assembly 306 may for example be similar to the dual melt accumulator described in U.S. Pat. No. 9,352,503 entitled "In an Injection Molding Machine, A Method of Controlling a Melt Accumulator," which is hereby incorporated by reference hereinto. The shooting pot assembly 306 is shown in greater detail in subsequent drawings, described below.

The shooting pot assembly 306 is slidably mounted to the stationary base 307. In the present embodiment, wear pads 309 on an underside of the shooting pot assembly 306 facilitate sliding of the assembly 306 atop the surface of base 307 responsive to longitudinal force generated by carriage cylinders 311. As a result, the assembly 306 is longitudinally translatable between a production position and a purging position, as will be described. In FIG. 3, the shooting pot assembly 306 is shown in the production position. When the shooting pot assembly 306 is in the production position, the injection unit 304 may also be considered to be in the production position. This is despite the fact that some parts of the injection unit 304 (e.g. heated melt pipe 314, described below) are stationary.

For clarity, the mutually orthogonal dimensions X, Y, and Z shown in FIG. 3 refer to the transverse, longitudinal (axial), and vertical dimensions, respectively. Any depiction of dimensions X, Y, and/or Z in subsequent drawings will be consistent with FIG. 3.

The heated melt pipe 314 of FIG. 3 is intended to receive melt from the output melt conduit 402 of machine 400 and to channel the melt towards the shooting pot assembly 306. The heated melt pipe 314 is heated by an array of band heaters (not visible in FIG. 3), described below. The pipe 314 and heaters are collectively housed inside a cover 315. The cover 315, which includes an insulating material (e.g. blanket), is provided for safety and heat conservation reasons. The cover 315, along with melt pipe 314 and the associated array of heaters, is supported by a support post 316 fixedly mounted to the stationary base 307 of the injection unit 304. It will be appreciated that the heated melt pipe 314 is accordingly stationary, i.e. not longitudinally translatable like the shooting pot assembly 306.

The telescopic melt coupling 320 is disposed between the heated melt pipe 314 and the shooting pot assembly 306. The telescopic melt coupling 320 is extendible, i.e. has a variable length. This permits the shooting pot assembly 306 to be longitudinally translated between the production position and a purging position without breaking the fluid melt connection between the shooting pot assembly 306 and the stationary heated melt pipe 314. In FIG. 3, the telescopic melt coupling 320 is covered by a cover 322 and so is not visible.

The injection molding machine 300 is controlled by a controller 351 based in part on human operator input. The controller 351 comprises at least one processor in communication with volatile or non-volatile memory storing computer-readable program code stored on a tangible medium 319, e.g., ROM, optical disk, USB drive, or magnetic storage medium. In some embodiments, the computer-readable program code may be transmitted to the memory via a modem or communications adapter communicatively coupled to a network, e.g. a wide area network such as the Internet. The controller 351 may for example be an industrial PC, e.g. a Beckhoff® model CP22xx Panel PC with Intel® Core™ i processor.

Control instructions may be entered by a human operator via human-machine interface (HMI) 352, which may for example be a multi-function touchscreen that forms part of, or is coupled to, the controller 351. The HMI 352 allows a human operator to control operation of the injection molding machine 300, including movement of the shooting pot assembly 306 between the production and purging positions, as will be described. In FIG. 3, a human operator 350 is depicted by an icon that is approximately to scale relative to the size injection molding machine 300, providing a general sense of scale of the depicted embodiment.

The molding material recycling machine 400 converts post-consumer molding material (e.g. PET) into purified melted molding material (e.g. rPET) for re-use. The recycling machine 400 may process molding material through a series of stages, including compaction, melting, degassing, and filtration stages. The machine may for example be a Vacurema® 2318t machine from Erema® Engineering Recycling Maschinen und Anlagen Ges.m.b.H. The purified molding material is output from the recycling machine 400 in molten form via a melt conduit 402. It will be appreciated that the depiction of the recycling machine 400 in FIG. 3 is a schematic representation that is not necessarily to scale and does not reflect the typical complexity of the machine 400.

Figure 5:
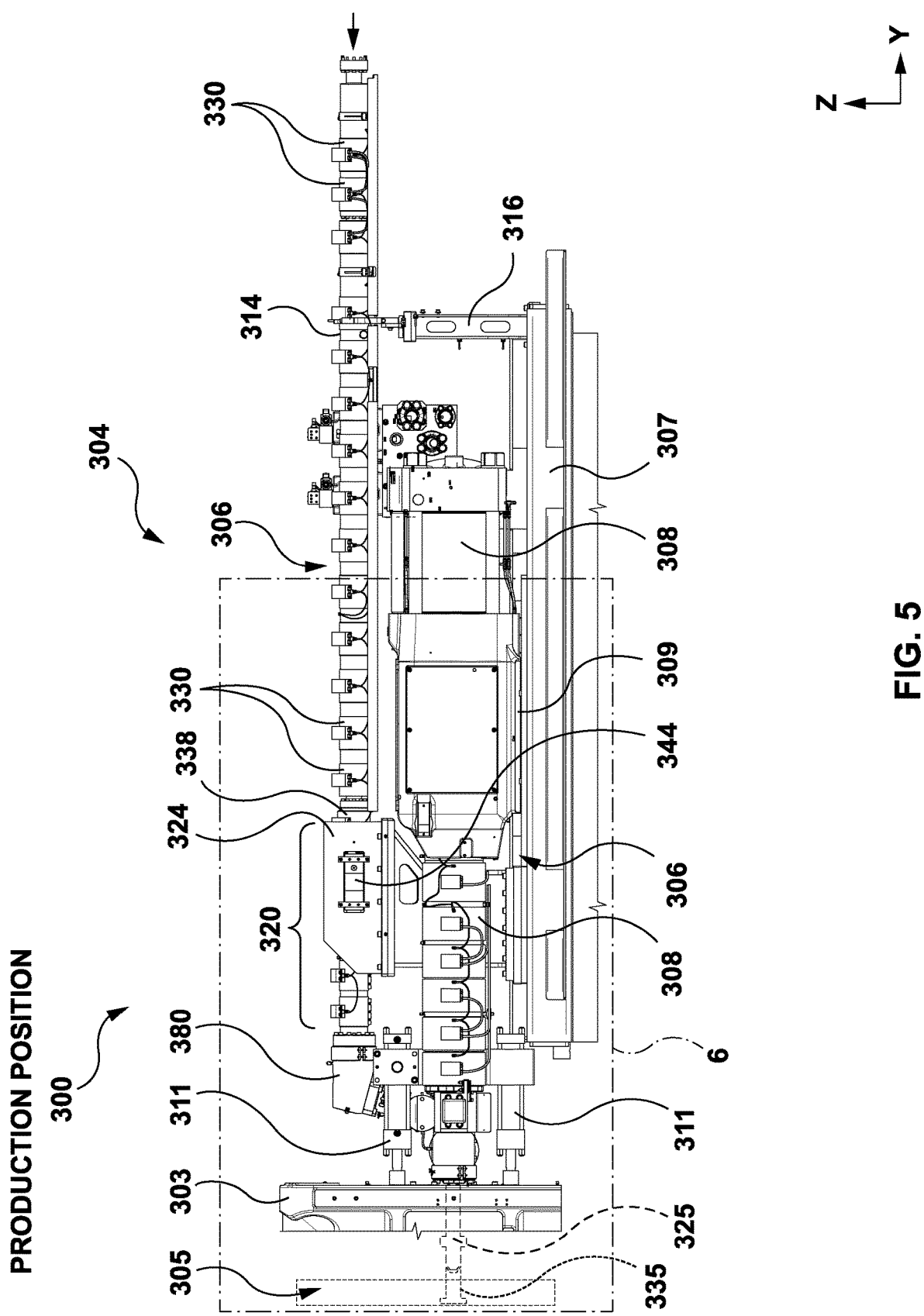
FIG. 5 is a front elevation view of an injection unit of the injection molding machine of FIG. 3 in a production position.
Figure 6:
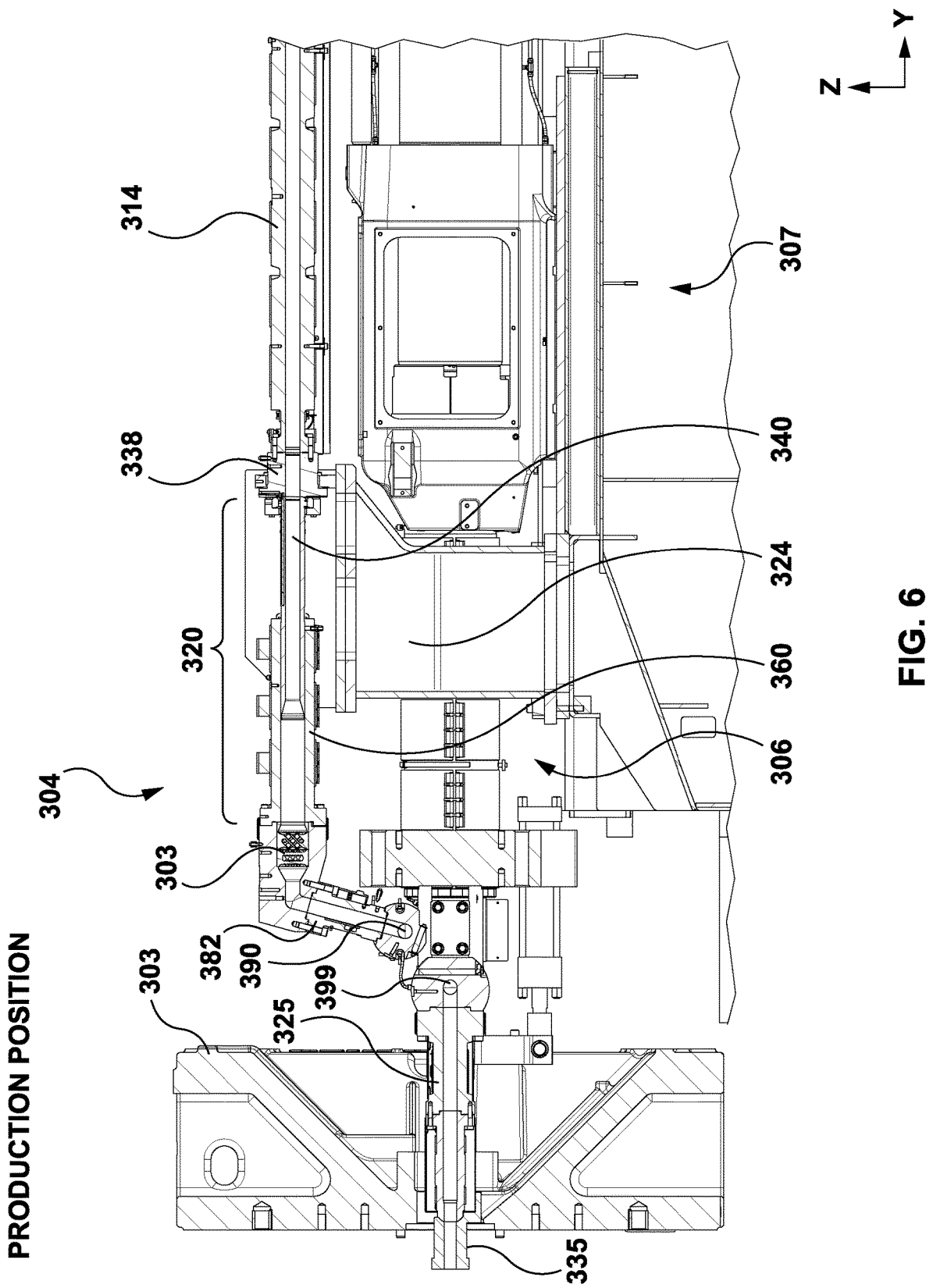
FIG. 6 is a longitudinal cross-section of a portion of the injection unit of FIG. 5 including a telescopic melt coupling as it appears when the injection unit in the production position.
Figure 7:
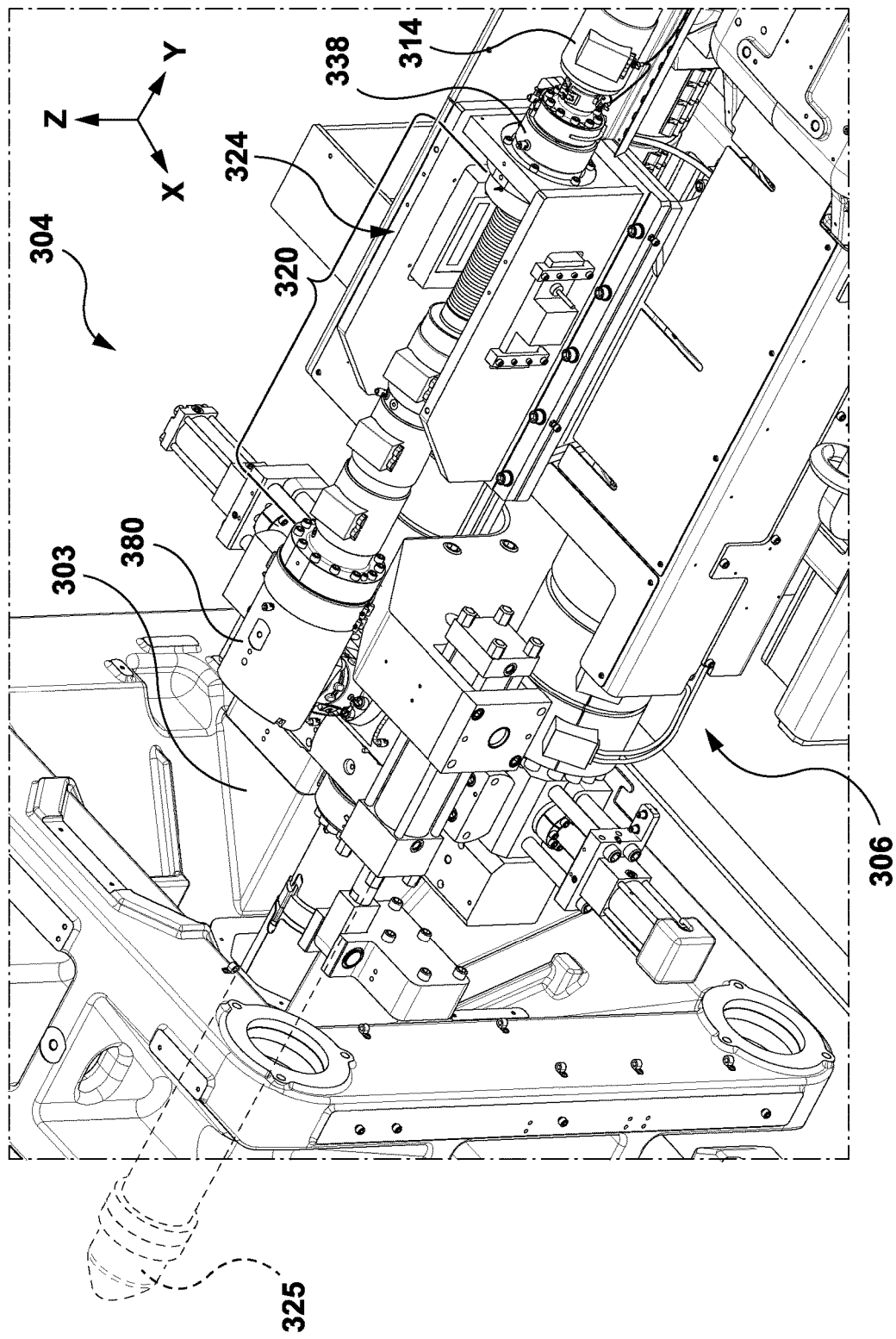
FIG. 7 is a top perspective view of a portion of the injection unit of FIG. 5 as it appears when the injection unit is in the production position.

FIG. 5 depicts the injection unit 304 of FIG. 3 in front elevation view with covers 315 and 322 removed. FIG. 6 is a front elevation view of a longitudinal cross-section of a portion of the injection unit, including the telescopic melt coupling 320, taken along line 6-6 of FIG. 3. FIG. 7 is a top perspective view of a portion of the injection unit 304 including the telescopic melt coupling 320. In each of FIGS. 5, 6, and 7, the telescopic melt coupling 320 is shown in the production (i.e. extended) position.

Referring to FIG. 5, the heated melt pipe 314 is supported between support post 316 and a support frame 324. The support frame 324 is a rigid stationary structure that supports and houses the telescopic melt coupling 320.

Figure 8:
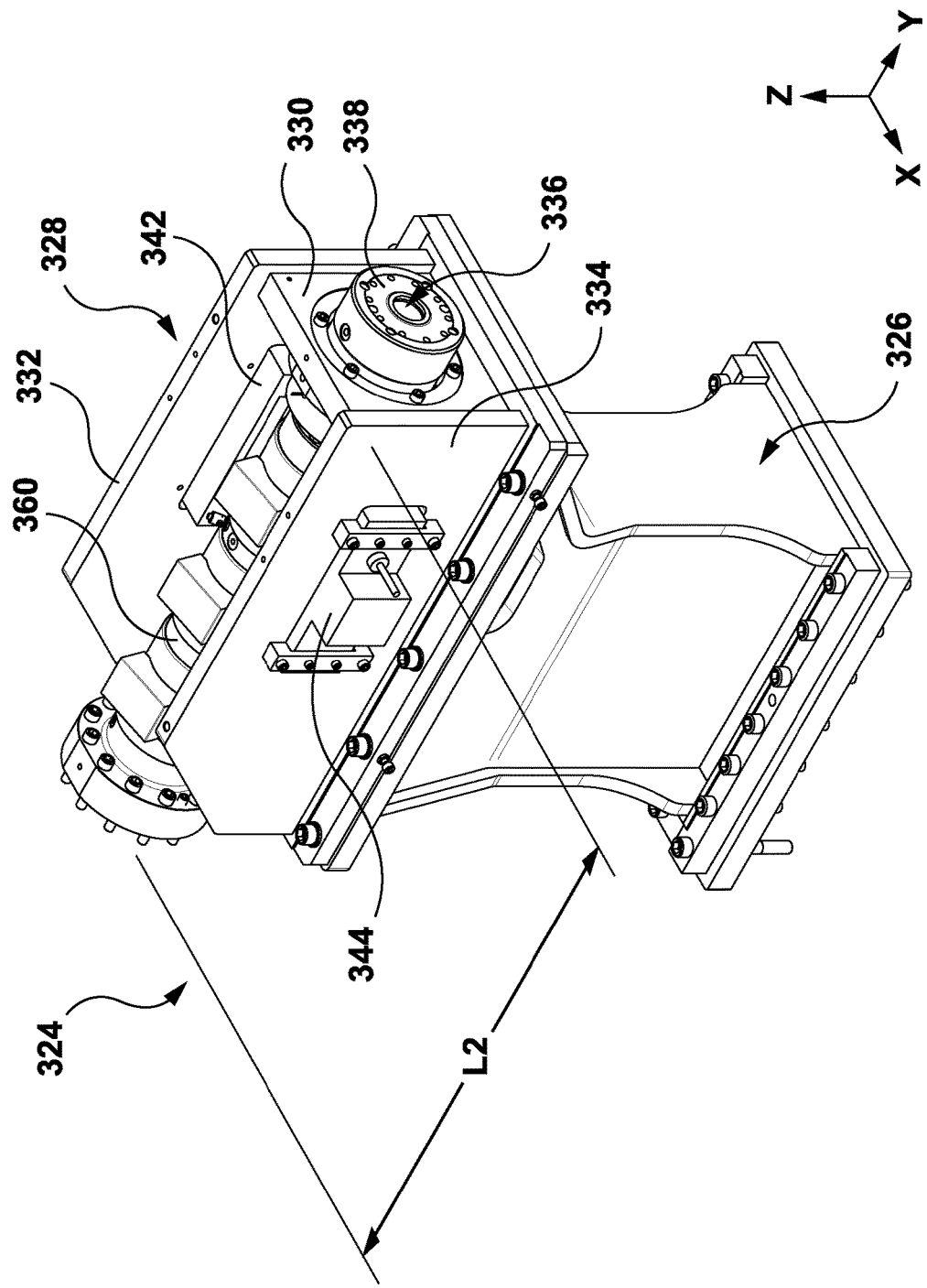
FIG. 8 is a top perspective view of a support frame and the telescopic melt coupling supported thereby, in isolation from the remainder of the injection unit, as they appear when the injection unit is in the purging position.
Figure 9:
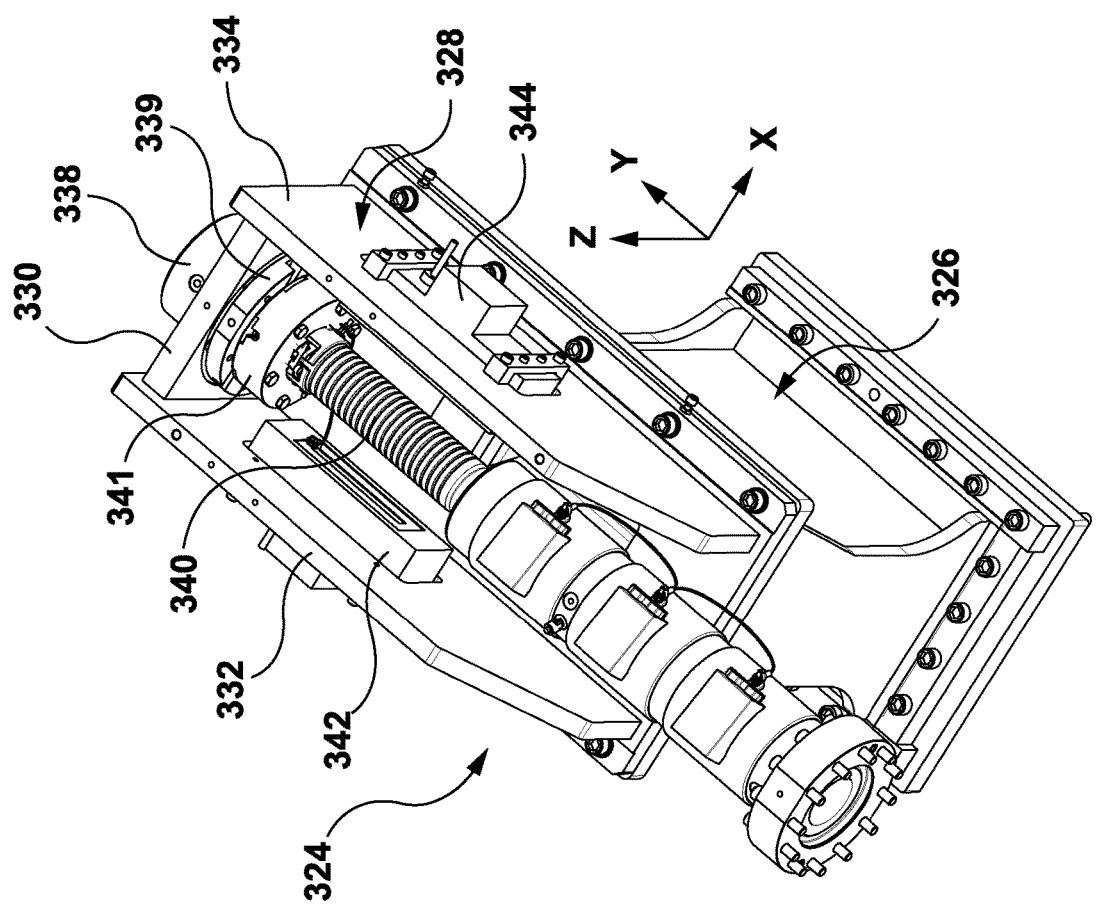
FIG. 9 is a top perspective view of a portion of the support frame of FIG. 8 including the telescopic melt coupling as it appears when the injection unit is in the production position.
Figure 10:
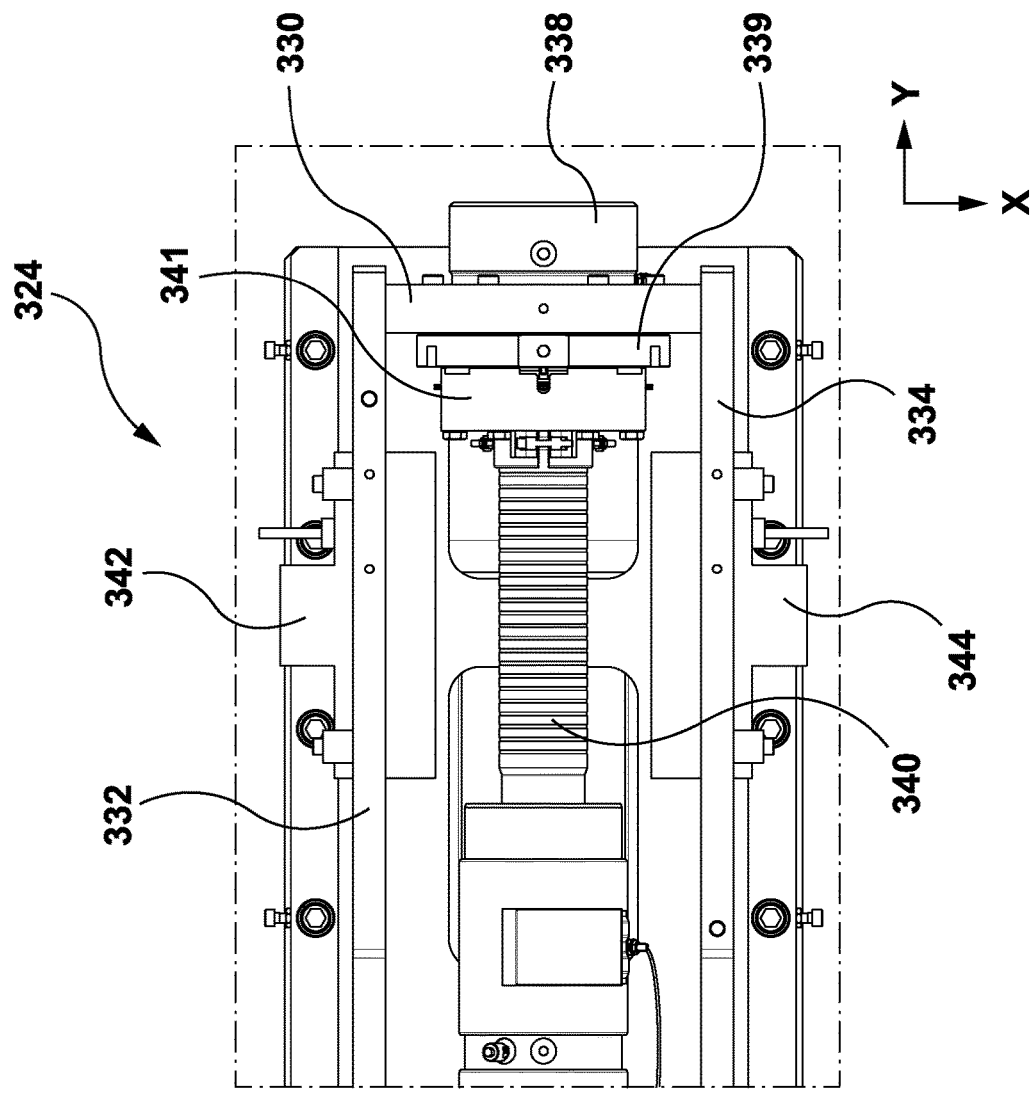
FIG. 10 is a top plan view of a portion of the support frame of FIG. 8 as it appears when the injection unit is in the production position.

The support frame 324 and telescopic melt coupling 320 are shown in greater detail, in isolation from the remainder of the injection unit 304, in FIGS. 8, 9, and 10. FIG. 8 depicts the support frame 324 in top perspective view with the telescopic melt coupling 320 in the purging position. FIGS. 9 and 10 depict the support frame 324 in top perspective view and top plan view, respectively, with the telescopic melt coupling 320 in the production position.

As perhaps best seen in FIG. 8, the support frame 324 has a base portion 326 and an upper portion 328. The base portion 326 is configured for attachment to the base 307 of the injection unit 304, e.g. as shown in FIGS. 5 and 6. The upper portion 328 of the support frame 324 has three adjoining upstanding walls: a transverse wall 330 and two adjoining longitudinal walls (sidewalls) 332, 334. The walls 330, 332, and 334 collectively form three sides of an open box whose missing wall is furthest from the heated melt pipe 314. As will be appreciated, the open, downstream end of the box permits the telescopic melt coupling 320 to extend longitudinally into the production position of FIGS. 9 and 10.

Referring to FIGS. 8, 9, and 10, an annular melt pipe coupler 338 is fixedly mounted in a circular aperture 336 through transverse wall 330 of support frame 324 so as to be stationary. The melt pipe coupler 338 fluidly interconnects the downstream end of heated melt pipe 314 with the upstream end of a spigot 340 portion of the telescopic melt coupling 320 (see e.g. FIG. 6). The coupler 338 has an annular flange 339, wider than the aperture 336, that abuts an interior face of the wall 330 (see e.g. FIGS. 9 and 10).

A lock ring 341 (also visible in FIGS. 9 and 10) is attached to the downstream end of annular melt pipe coupler 338. The lock ring 341 keeps the spigot 340 in place while permitting limited movement thereof, as described below.

The support frame 324 also has a pair of inwardly facing infrared heaters 342, 344, mounted in sidewalls 332, 334 respectively, flanking the spigot 340 (see FIGS. 8, 9, and 10). These infrared heaters 342 are intended to heat the spigot 340 using infrared radiation when the telescopic melt coupling 320 is in the extended or production position of FIGS. 9 and 10. This is done to ensure that any conveyed melt is maintained at a desired temperature. The present embodiment also uses cartridge heaters as a redundant mechanism for heating the spigot 340, as described below.

Figure 11:
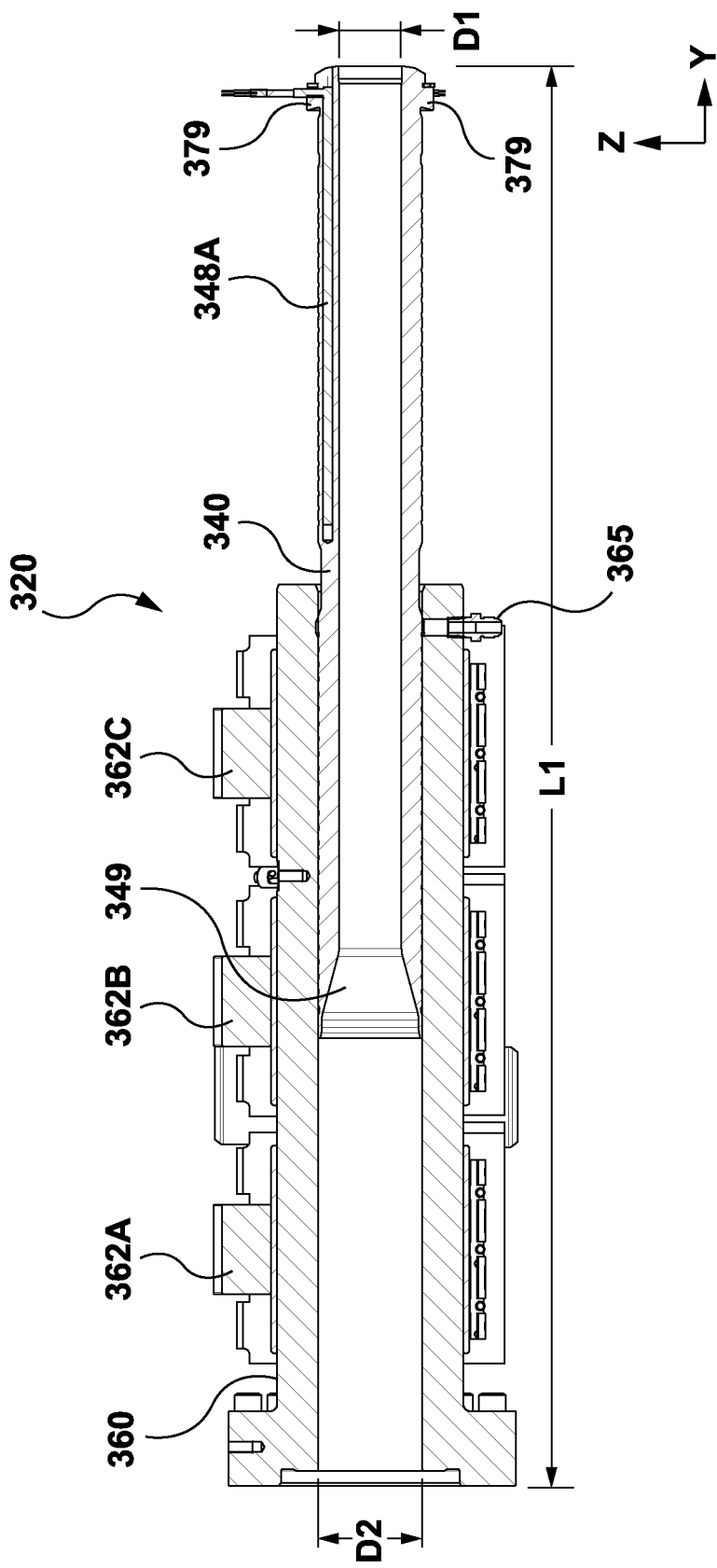
FIG. 11 is a longitudinal cross-section of the telescopic melt coupling of FIG. 6, in isolation, in an extended or production position.
Figure 12:
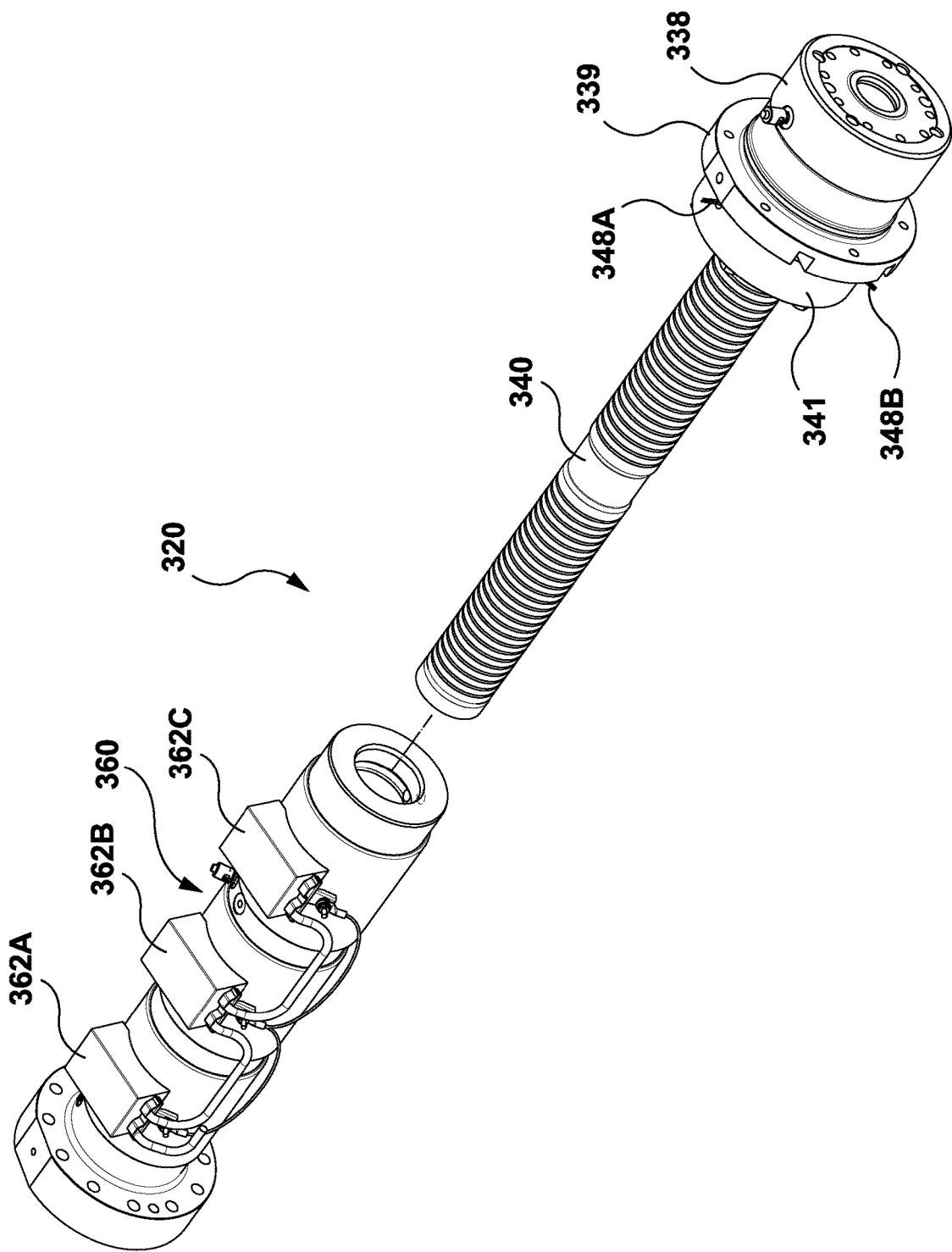
FIG. 12 is an exploded view of the telescopic melt coupling of FIG. 7 showing spigot and sleeve components thereof.

The telescopic melt coupling 320 is illustrated in isolation in FIGS. 11 and 12. FIG. 11 is a longitudinal cross-section of the melt coupling in the extended production position. FIG. 12 is an isometric exploded view of the telescopic melt coupling 320, with the annular melt pipe coupler 338 attached to the upstream end of the spigot 340.

As illustrated in FIGS. 11 and 12, the telescopic melt coupling 320 has two primary components: the spigot 340 and a sleeve 360. These two components slidably engage one another in the manner of a telescope, with the sleeve 360 sliding about the spigot 340. Extending and collapsing the telescopic melt coupling 320 allows the length of the longitudinal fluid melt path defined thereby to be adjusted between an extended length L1 (as shown in FIG. 11) and a collapsed length L2 (as shown in FIG. 8), where L1>L2. In the present embodiment, the sleeve 360 slides back and forth longitudinally about the spigot 340, which remains substantially stationary. A tight fit between the spigot 340 and sleeve 360 facilitates the creation of a seal for substantially containing melt between the two.

When the shooting pot assembly 306 is in the production position of FIGS. 5, 6, and 7, the telescopic melt coupling 320 is extended with length L1. Conversely, when the shooting pot assembly 306 is in the purging position of FIGS. 21 and 22 (described below), the telescopic melt coupling 320 is collapsed with length L2. The extended and collapsed positions of the telescopic melt coupling 320 may accordingly be referred to as its production and purging positions, respectively.

Referring to FIG. 11, the spigot 340 and sleeve 360 have inner diameters D1 and D2 respectively, where D1<D2. The outer diameter of the spigot 340 is slightly smaller than the inner diameter D2 of the sleeve 360. The sizing of these components permits them to slidably engage one another as described above but substantially prevents melt from leaking between them.

The channel defined by the spigot 340 flares outwardly at its downstream end. This flared section 349 may limit the formation of areas of slow-moving or stagnant melt that might otherwise form, e.g. if the widening of the inner diameter were more abrupt.

Referring to FIG. 11, the sleeve 360 is encompassed by a contiguous array of three band heaters 362A, 362B, 362C (generically or collectively heater(s) 362). These heaters circumferentially heat the sleeve 360, to maintain the melt flowing therethrough at a desired temperature. In the present embodiment, the heaters 362A, 362B, and 362C are activated both when the telescopic melt coupling 320 is in the extended production position of FIG. 11 and when the telescopic melt coupling 320 is in the collapsed position of FIG. 8.

Referring to FIG. 12, it can be seen that the exterior surface of the spigot 340 has a plurality of annular ridges 343 defined therein. The ridges 343 define a sealing surface with the interior of sleeve 360 that substantially contains melt. A central flat undercut area 345 defines a space in which any melt which may leak, e.g. due to part wear over time, may be collected. Any collected melt may be periodically drained via a drool port 365 in sleeve 360 (see FIG. 11).

As noted above, the spigot 340 of the present embodiment is heated using cartridge heaters, in addition to infrared heaters 342, 344 shown in FIGS. 8-10, when the telescopic melt coupling 320 is in the extended or production position. In one embodiment, the cartridge heaters and the infrared heaters are both activated simultaneously whenever the telescopic melt coupling 320 is in the extended position. In another embodiment, one of the two types of heater may act as a primary heater, and the other type of heater may act as a failsafe heater that activates in the event of failure of the primary heater. Some embodiments may employ only one of the two types of heaters, as each type may be advantageous in different respects. For example, infrared heaters may be more costly but may be easier to maintain or replace if defective. The cartridge heaters are shown in FIGS. 13 and 14.

Figure 13:
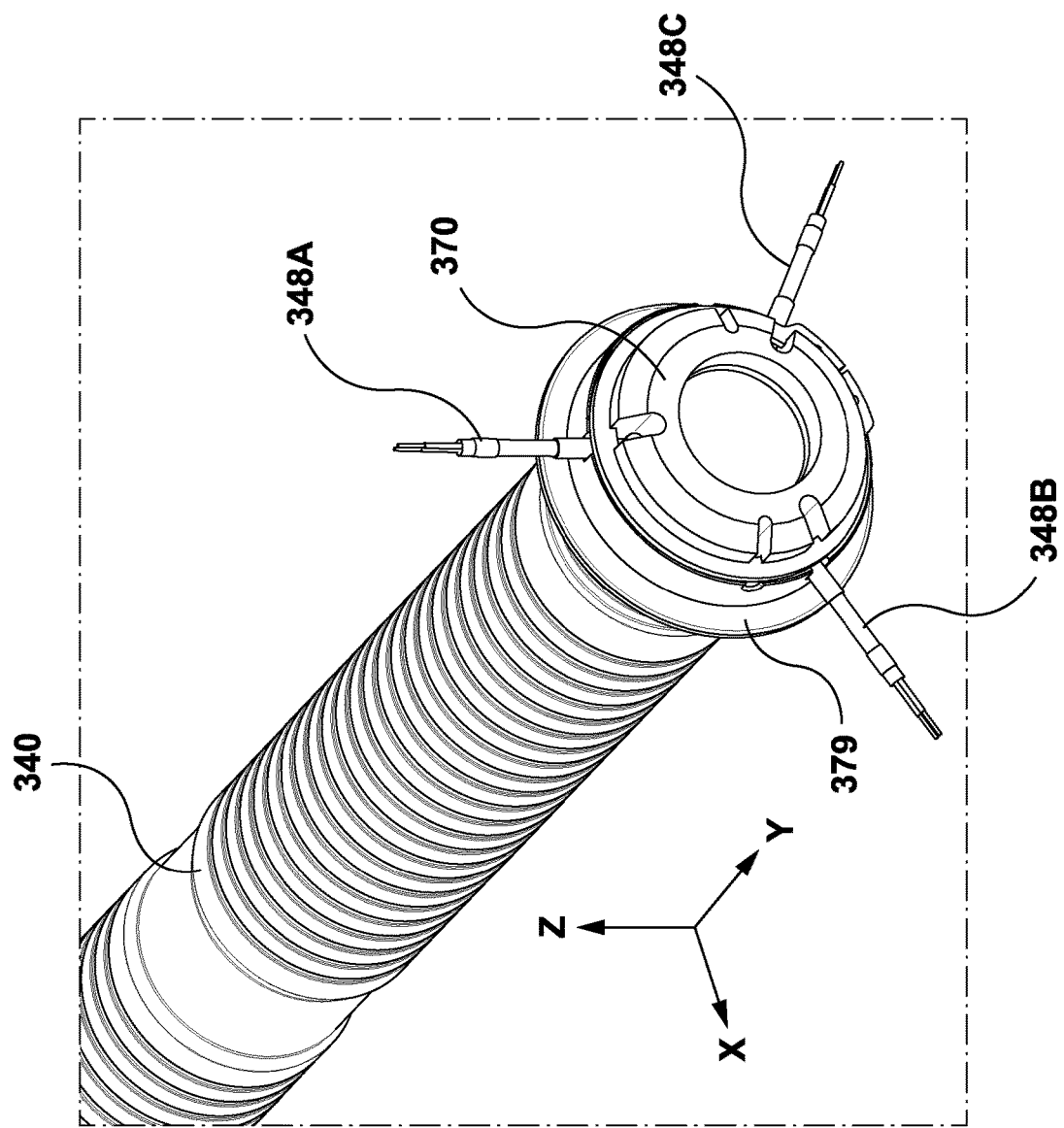
FIG. 13 is a perspective view of a portion of the spigot of FIG. 12 showing a convex spherical connection joint mating face defined at the upstream end of the spigot.
Figure 14:
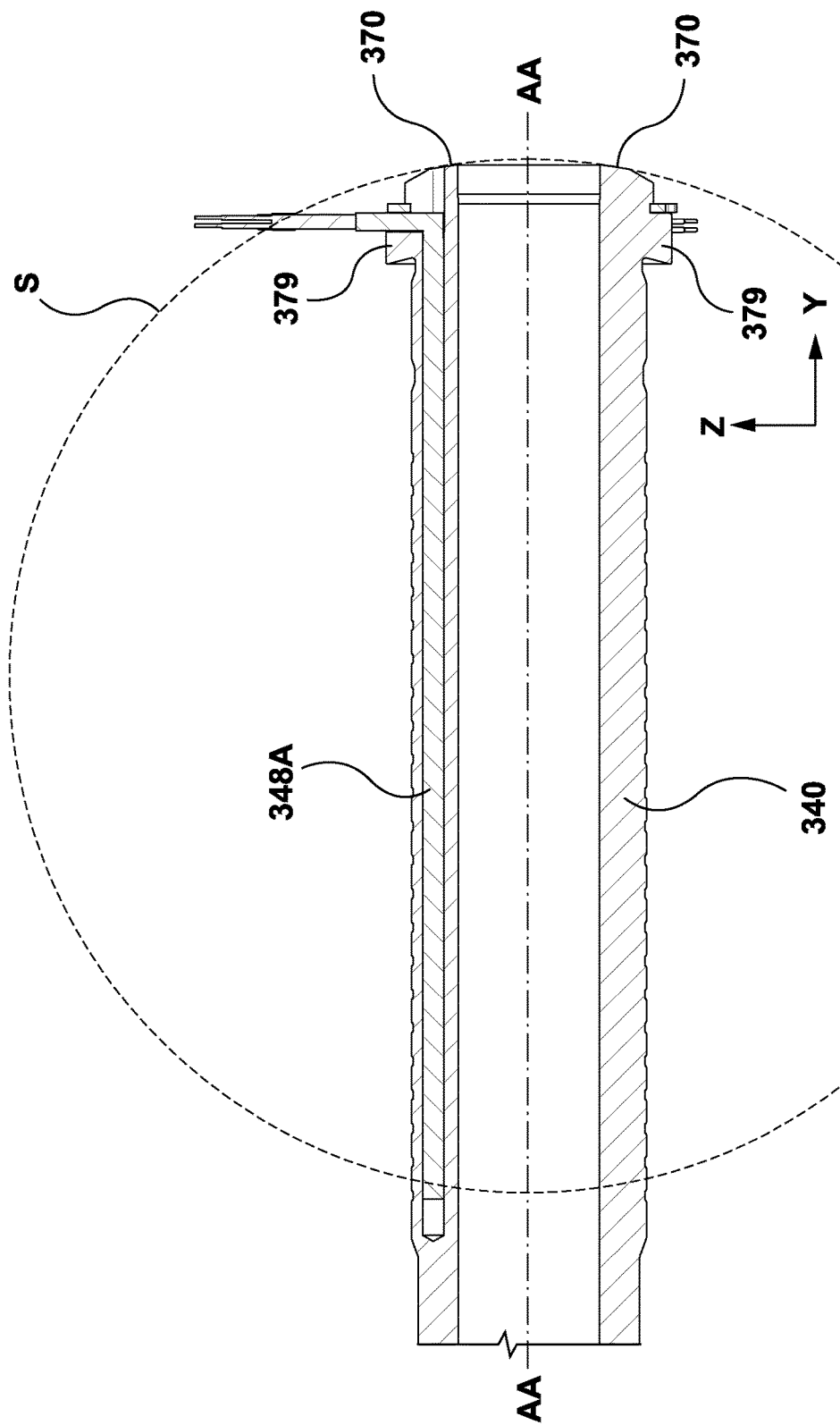
FIG. 14 is a longitudinal cross-section of the portion of the spigot of FIG. 13.

FIG. 13 is an isometric view of an upstream end of the spigot 340 showing radially protruding proximal ends of three cartridge heaters 348A, 348B, and 348C (collectively or generically cartridge heater(s) 348). Each cartridge heater 348 is a narrow cylindrical resistive element having a diameter approximately 50% of the thickness of the wall of spigot 340. Each of the three heaters 348 is oriented longitudinally and is embedded in the wall of the spigot 340, e.g. as shown in the in the longitudinal cross-section of FIG. 14. Embedding the heaters 348 in the wall of the spigot 340 facilitates heating of the spigot 340 by conduction. Moreover, the embedding avoids any interference with the spigot's slidable engagement with sleeve 360 on the external surface of the spigot 340 or with melt flow on an internal surface of the spigot 340.

The three cartridge heaters 348A, 348B, 348C are equally spaced about the circumference of the spigot 340 in the present embodiment. As such, each of the three cartridge heaters 348 is offset from each of the other cartridge heaters by 120 degrees along the circumference of the spigot 340. In view of this arrangement, only the first cartridge heater 348A is visible in the longitudinal cross-section of FIG. 14. A longitudinal passage may be bored into the spigot wall between adjacent cartridge heaters to accommodate a thermocouple or other form of temperature sensor. The protruding end of each of the heaters 348A, 348B, and 348 extends radially at a right angle to the embedded portion of the heater (see FIG. 13) and is terminated with a pair of wires for electrically powering the heater.

The use of three embedded longitudinal cartridge heaters 348A, 348B, 348C, spaced equally as described, has been found to heat the spigot 340 sufficiently uniformly about its circumference, by conduction, for maintaining the desired melt temperature. This is in view of the heat conductivity of the material from which the example spigot 340 is made, e.g. which may be steel, Nitralloy 135M, or similar. Alternative embodiments may use a different number or shape of cartridge heaters, e.g. depending upon the efficiency of the heaters, the heat conductivity of the material from which the spigot is made, or other factors, or may heat the spigot 340 in another way.

It will be appreciated that the cartridge heaters 348 are redundant to the infrared heaters 342, 344 (see FIGS. 9, 10, and 11). The redundancy is intended to provide flexibility in heating the spigot 340 when the telescopic melt coupling 320 is in the production position. The cartridge heaters 348 heat the spigot 340 internally by conduction, and the infrared heaters 342, 344 heat the spigot 340 externally by radiation. The cartridge heaters 348 can be activated together with, or alternatively to, the infrared heaters 342, 344.

Referring to FIGS. 11 and 13, it can be seen that the upstream end of spigot 340 has an annular flange 379 extending therefrom. This flange 379 facilitates connection of the spigot 340 with the annular melt pipe coupler 338, as will be described.

Referring back to FIGS. 5, 6, and 7, it will be appreciated that the telescopic melt coupling 320 is longitudinally aligned, i.e. coaxial, with the heated melt pipe 314 of injection unit 304. The inventors consider that, in view of forces that are likely to be applied to the telescopic melt coupling 320 during use, there is some risk that the telescopic melt coupling 320 may become angularly axially misaligned with the heated melt pipe 314 over time. That is, the downstream end of the telescopic melt coupling 320 may become raised, lowered, or laterally displaced relative to the upstream end of the telescopic melt coupling 320 that is connected to the annular melt pipe coupler 338. The forces that may cause this effect may include one or more of: bending moments from repeated extension and collapsing of the coupling 320 as the shooting pot assembly 306 reciprocates between production and purging positions; thermal expansion of components of injection unit 304; and manufacturing tolerances of these components. These factors may have a compounding effect. Particularly in view of the fact that only one end of the telescopic melt coupling 320 is attached to the support frame 324—the upstream end, which is attached at the annular melt pipe coupler 338 by lock ring 341—it is possible that, over time, the longitudinal axis of the telescopic melt coupling 320 may cease to be parallel with that of the heated melt pipe 314.

Figure 15:
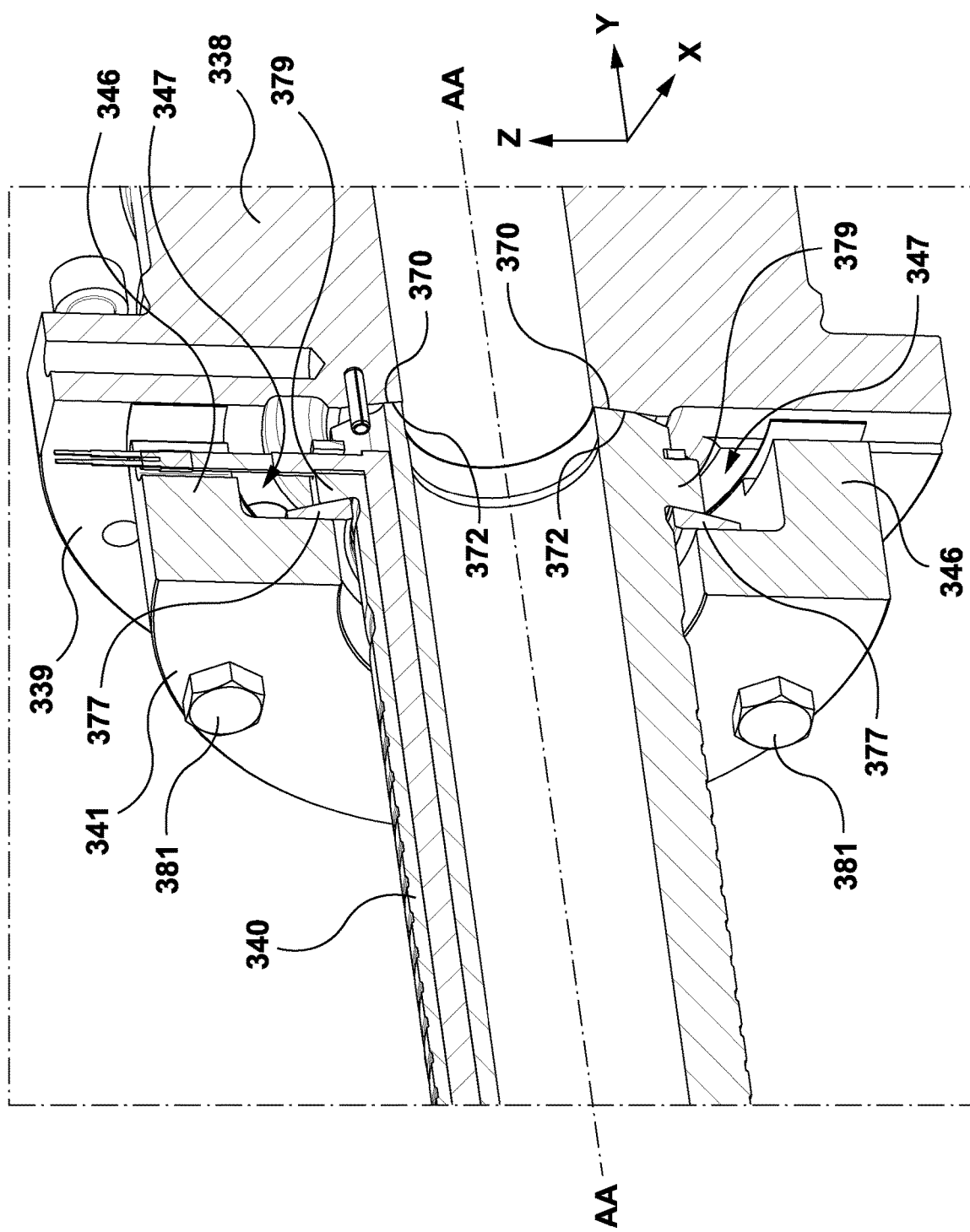
FIG. 15 is a perspective view of a longitudinal cross-section of the spherical connection between the upstream end of the spigot of FIG. 12 and an annular melt pipe coupler.

In view of this risk, the connection between the telescopic melt coupling 320 and the annular melt pipe coupler 338 has been designed as a spherical connection, best seen in FIGS. 14 and 15. The upstream end of the spigot 340 and the immediately adjacent mating face of the annular melt pipe coupler 338 have complementary surfaces 370, 372. The surfaces 370, 372 conform to a sphere S centered generally along the axis AA of the spigot 340 (see FIGS. 14 and 15), which is also the axis of the telescopic melt coupling 320. In the present embodiment, the surface 370 of the spigot 340 is slightly convex, and the complementary surface 372 of the annular melt pipe coupler 338 is slightly concave. This relationship could be reversed in an alternative embodiment. The result is a spherical or "ball-in-socket" type of connection joint between the two components 340, 338. This spherical connection renders the telescopic melt coupling 320 universally pivotable, to at least a limited extent, with respect to the annular melt pipe coupler 338, without compromising the fluid melt interconnection, i.e. with minimal melt leakage. This may promote robustness and cost efficiency and may minimize operational downtime of the injection molding system 200.

The complementary surfaces 370, 372 of the spherical connection are biased against one another in the present embodiment. More specifically, the lock ring 341 has an annular shoulder 346 on its upstream side. The annular shoulder 346 faces the annular flange 339 of the annular melt pipe coupler 338, creating an annular space 347 underneath the shoulder 346. The annular flange 379 of the spigot 340 is enclosed within this annular space 347. The relative sizing of these components permits a limited degree of longitudinal movement of the annular flange 379 within the annular space 347. A disc spring 377, a form of biasing element, also occupies annular space 347, being compressed between the lock ring 341 and the annular flange 379. The spring 377 is preloaded to an extent that may be adjustable by suitable tightening or loosening of bolts 381 holding the lock ring 341 to the coupler 338. The disc ring 377 may have an outward taper, and the annular flange 379 may have a reverse taper, i.e. may widen outwardly, in a complementary manner.

The pressure of the compressed spring 377 against the annular flange 379 urges the upstream end of spigot 340 against the annular melt pipe coupler 338. The resultant biasing together of spherical surface 370 against complementary spherical surface 372 may help keep pressurized melt from leaking from the spherical connection. It will be appreciated that the biasing by disc spring 377 persists regardless of whether pressurized melt is flowing through the telescopic melt coupling 320.

The telescopic melt coupling 320 is further designed to limit melt leakage from the spherical connection in another way when operating in the extended or production position. The telescopic melt coupling 320 is arranged so that the exposed end of the (narrower) spigot 340 is disposed upstream of the exposed end of the (wider) sleeve 360, rather than the opposite. This arrangement has the following effect. When pressurized melt flows through the extended telescopic melt coupling 320, the pressure of the melt within the downstream sleeve 360 will apply force, in the upstream (Y) dimension, upon the upstream spigot 340 that partly occupies the sleeve 360. The upstream-directed force upon spigot 340 may increase the pressure with which the spigot's spherical connection face 370 is pressed against the complementary face 372 of the annular melt pipe coupler 338. This increased pressure, which is supplementary to the biasing force generated by disc spring 377, may be considered to maximize protection against leaks at the spherical connection precisely when that protection is most needed: when pressurized melt is flowing through the telescopic melt coupling 320.

It will be appreciated that, during injection unit operation, the above-described forces from pressurized melt urging the spigot 340 in the upstream direction may be significant. The support frame 324 may be designed to oppose the forces and thereby shield the upstream melt source—e.g. the heated melt pipe 314 and the upstream pipe 402—from damage. For example, the structural members of the support frame 324 may be manufactured from a suitably strong material. Moreover, the base 326 of the support frame 324 may be well-anchored to the base 307 of the injection unit 304, e.g. using many bolt fasteners as shown.

Referring again to FIG. 6, it can be seen that the injection unit 304 further comprises a static mixer 380 in the melt path immediately downstream of the telescopic melt coupling 320. The purpose of the static mixer 380 is to improve the homogeneity of the melt, in terms of its temperature and viscosity, after the melt has been conveyed over what may be a significant distance-through the pipe 402 of the molding material recycling machine 400, the heated melt pipe 314, and the telescopic melt coupling 320. The static mixer 380 may for example have a structure as described in U.S. Pat. No. 7,198,400, which is hereby incorporated by reference hereinto. That is, the mixer 380 may include a mixer body with a first and a second array of intermeshed and interconnecting passageways formed therein that connect, and provide a convoluted flow path between, flow faces at ends of the mixer body. The first and second arrays of passageways may interconnect, such that the boundaries of adjacent intermeshed passageways overlap to form mixing portals.

The injection unit 304 further comprises a downwardly sloped melt conduit 382 in the melt path immediately downstream of the static mixer 380 (FIG. 6). This melt conduit 382 conveys melt into the shooting pot assembly 306, whose various melt conduits are described below in conjunction with FIG. 18.

The injection unit 304 is configured with a plurality of heaters along the melt path from the molding material recycling machine 400 to the shooting pot assembly 306. These heaters are intended to keep the conveyed melt at an optimal temperature under the control of controller 351. The optimal temperature at various stages along the melt path may be dependent on various factors, e.g. the type of molding material, including its viscosity at various temperatures and the risks of temperature-based melt degradation at various temperatures (e.g. formation of acetaldehyde), energy efficiency considerations, residence time of the melt in the shooting pots, and others. The optimal temperature at various stages along the path may ultimately be a compromise among these sometimes competing factors and may vary between embodiments.

Melt from exemplary molding material recycling machine 400 (FIG. 3) is output at a first temperature T1, referred to as its recycling temperature. In the present embodiment, this recycling temperature T1 is lower than a second, target temperature T2 for injecting the melt into a mold, referred to as its injection temperature. If the molding material is rPET, the recycling temperature T1 may for example be approximately 270 degrees Fahrenheit, and the injection temperature may for example be approximately 285 degrees Fahrenheit.

Figure 16:
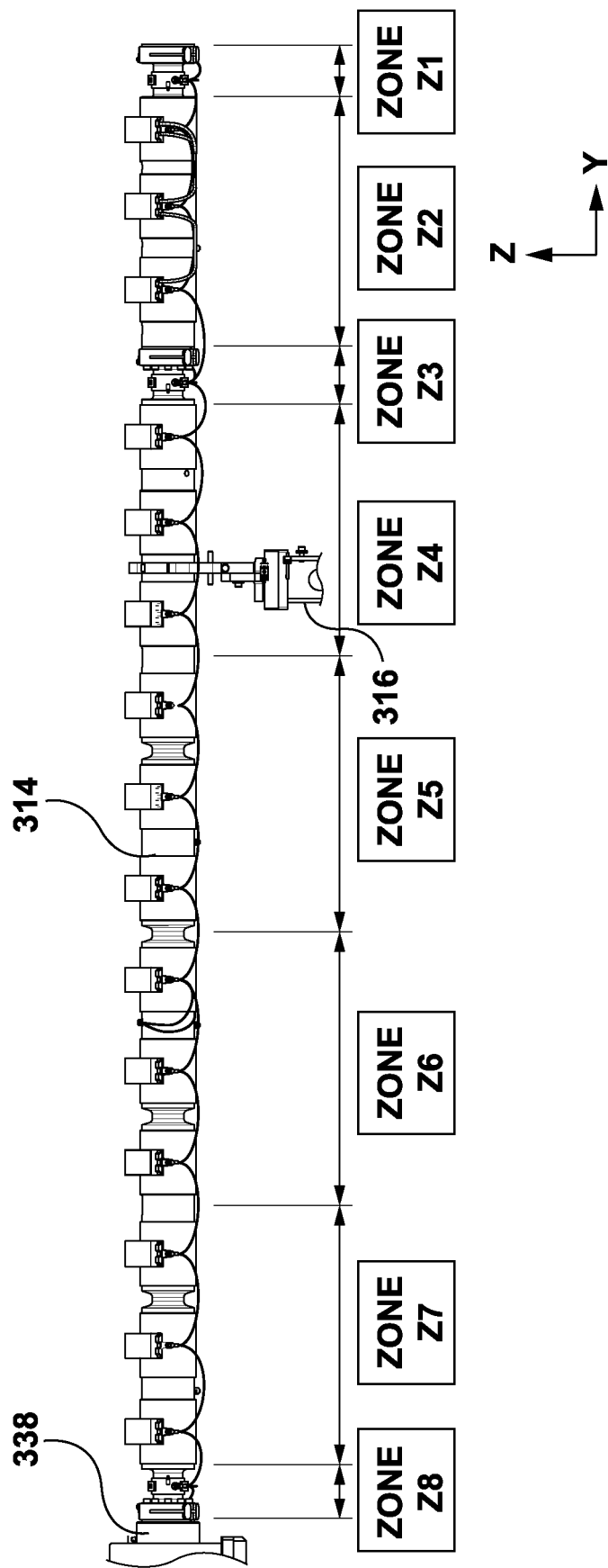
FIG. 16 is a front elevation view of the heated melt pipe in isolation from the remainder of the injection unit showing an array of heaters and associated heating zones of the melt pipe.
Figure 17:
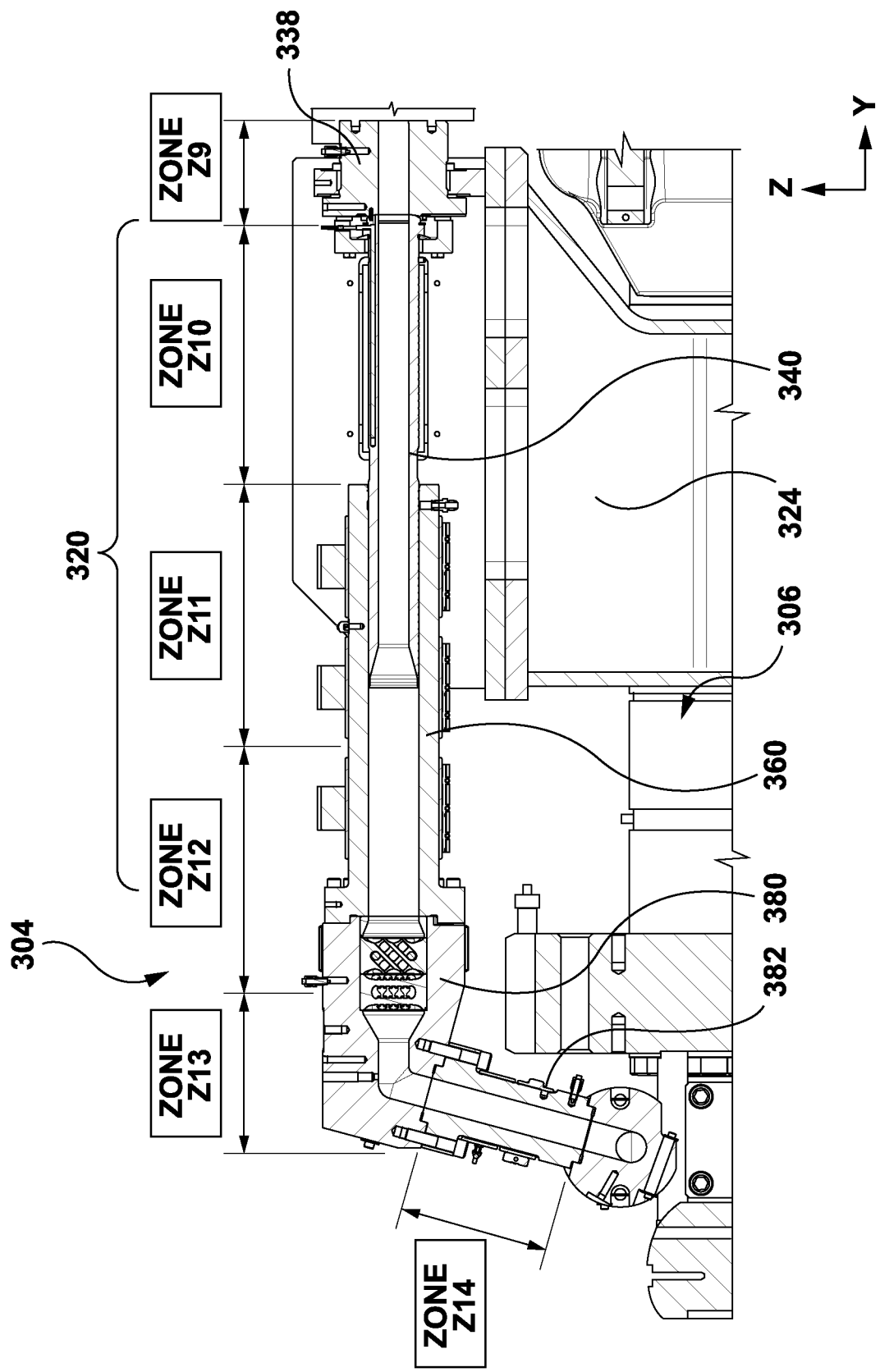
FIG. 17 is a longitudinal cross section of the telescopic melt coupling and downstream components when the injection unit is in the production position showing a further plurality of heating zones.

In the present embodiment, the plurality of heaters along the melt path of injection unit 304 are grouped according to fourteen sequential zones labeled Z1 to Z14 in the downstream direction. These zones are depicted in FIGS. 16 and 17. Each zone may comprise at least one independently controllable heater and a temperature sensing device. In the present embodiment, most of the heaters are band heaters, chosen because they are suitable for encompassing the relevant melt conduit in that zone. However, some zones employ other forms of heaters, such as the infrared heaters 342, 344 and the cartridge heaters 348 employed to heat the spigot 340 of the telescopic melt coupling 320 in zone Z10 (FIG. 17, described below). They types of heaters used in alternative embodiments may vary.

Referring to FIG. 16, a front elevation view of the heated melt pipe 314 is depicted. Starting from the upstream end (right side of FIG. 16), eight heater zones Z1-Z8 are defined sequentially along the melt pipe 314. Most of the zones are of uniform length. However, zones Z1, Z3, and Z8 are shorter than the others. In the present embodiment, the length of a heater zone is determined, at least in part, by the heat absorption and/or heat dissipation characteristics of the melt conduit in that zone. For example, zone Z1 comprises a coupling flange 385, and zone Z8 comprises the annular melt pipe coupler 338, each of which absorbs and/or dissipates more heat than the conduits in the other zones of FIG. 16.

Turning to FIG. 17, a longitudinal cross-section of the telescopic melt coupling 320 and downstream components of injection unit 304 when the shooting pot assembly 306 in the production position is depicted. Starting from the upstream end (right side of FIG. 17), six heater zones Z9-Z14 are defined sequentially along the melt path. These zones vary in length for similar reasons as those mentioned above in connection with FIG. 16. In the present embodiment, all of the zones use band heaters except zones Z9 and Z10. Zone Z9 employs cartridge heaters in the present embodiment.

The heaters may be controlled by controller 351 to define a monotonically increasing temperature gradient in zones Z1-Z14. The temperature gradient may for example be linear, exponential, or otherwise, as appropriate for the embodiment in question. For example, the temperature gradient may be chosen so as to minimize melt degradation or yellowing by keeping melt at as low of a temperature as possible for as long as possible while maintaining viscosity at least at a threshold level for the molding material being used. The temperature gradient may account for the duration of time required to heat the melt and its residency time in the melt path.

Figure 18:
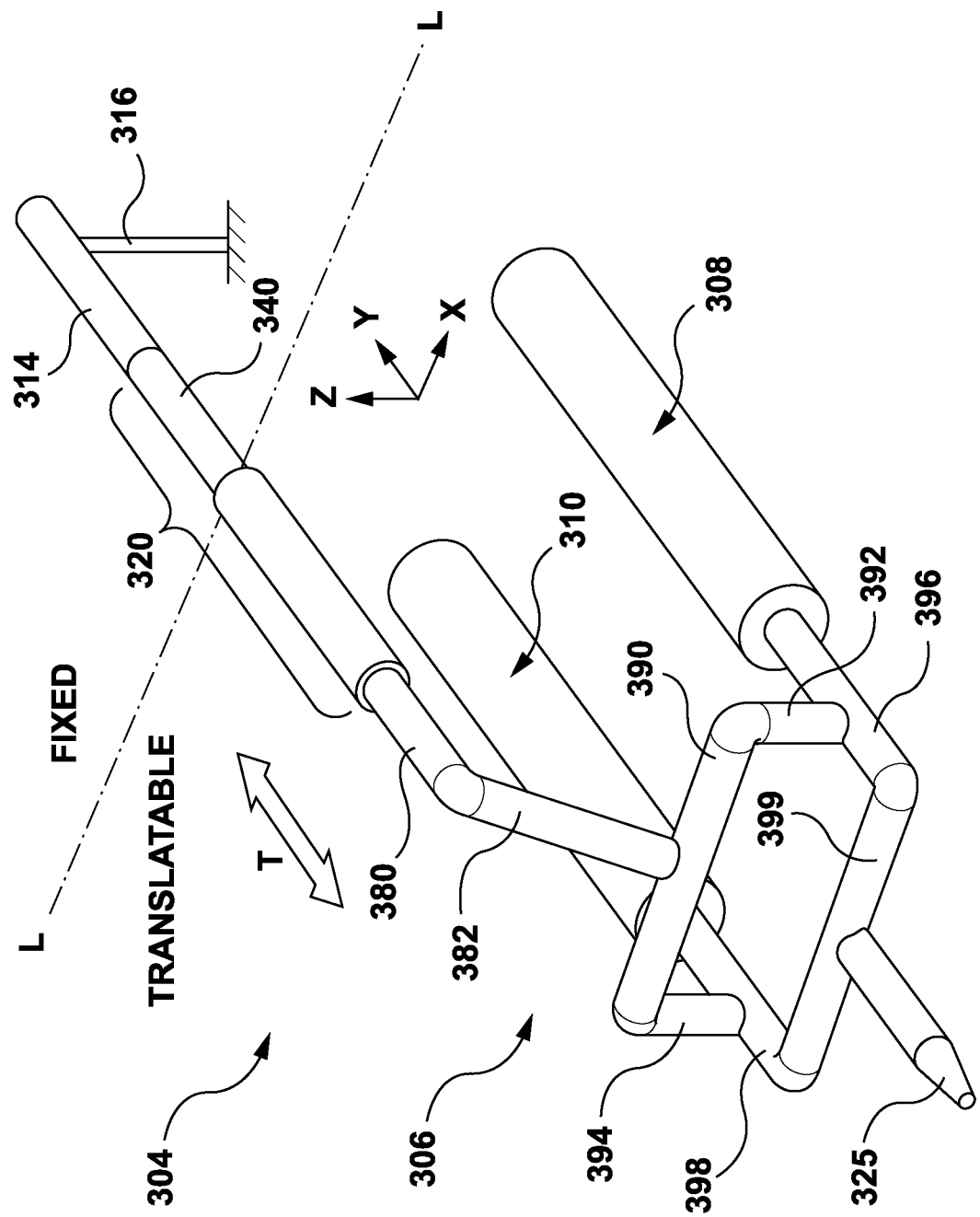
FIG. 18 is a simplified three-dimensional schematic diagram of melt flow paths defined within the injection unit of FIG. 5 when the injection unit is in the production position.

FIG. 18 is a simplified three-dimensional schematic diagram of melt flow paths defined within the injection unit 304 when the shooting pot assembly 306 is in the production position. Line L-L separates the components of injection unit 304 into two groups: fixed components and translatable components.

Fixed components of injection unit 304 include the heated melt pipe 314 and the spigot portion of the telescopic melt coupling 320. These components are stationary, as represented in FIG. 18 by support post 316 anchored to ground. For clarity, in this context the spigot 340 is considered stationary despite its limited capacity for longitudinal travel, in view of the vastly larger degree of longitudinal travel of which the translatable components are capable between their production and purging positions.

The remaining components of injection unit 304 depicted in FIG. 18 are translatable in the direction depicted by the double-headed arrow T. Translatable components include the sleeve 360 portion of the telescopic melt coupling 320, the stationary mixer 380, the downwardly sloped melt conduit 382, and the shooting pot assembly 306. Within the shooting pot assembly 306, a network of melt conduits is translatable as a unit. These melt conduits include upper transverse melt conduit 390, vertical melt conduits 392 and 394, axial melt conduits 396 and 398, and lower transverse melt conduit 399. The shooting pots 308 and 310 and nozzle 325 are also considered as part of the shooting pot assembly 306 and are translatable along with the aforementioned components.

It will be appreciated that, when the translatable components of the injection unit 304 are translated in unison towards or away from the fixed components, the telescopic melt coupling 320 expands and collapses axially in the Y dimension of FIG. 18. The fluid melt connection from the heated melt pipe 314 to the shooting pot assembly 306 is thereby maintained, regardless of whether the injection unit 304 is in the production position (as shown in FIG. 18) or the purging position (as shown in FIGS. 21 to 24, described below).

Figure 19:
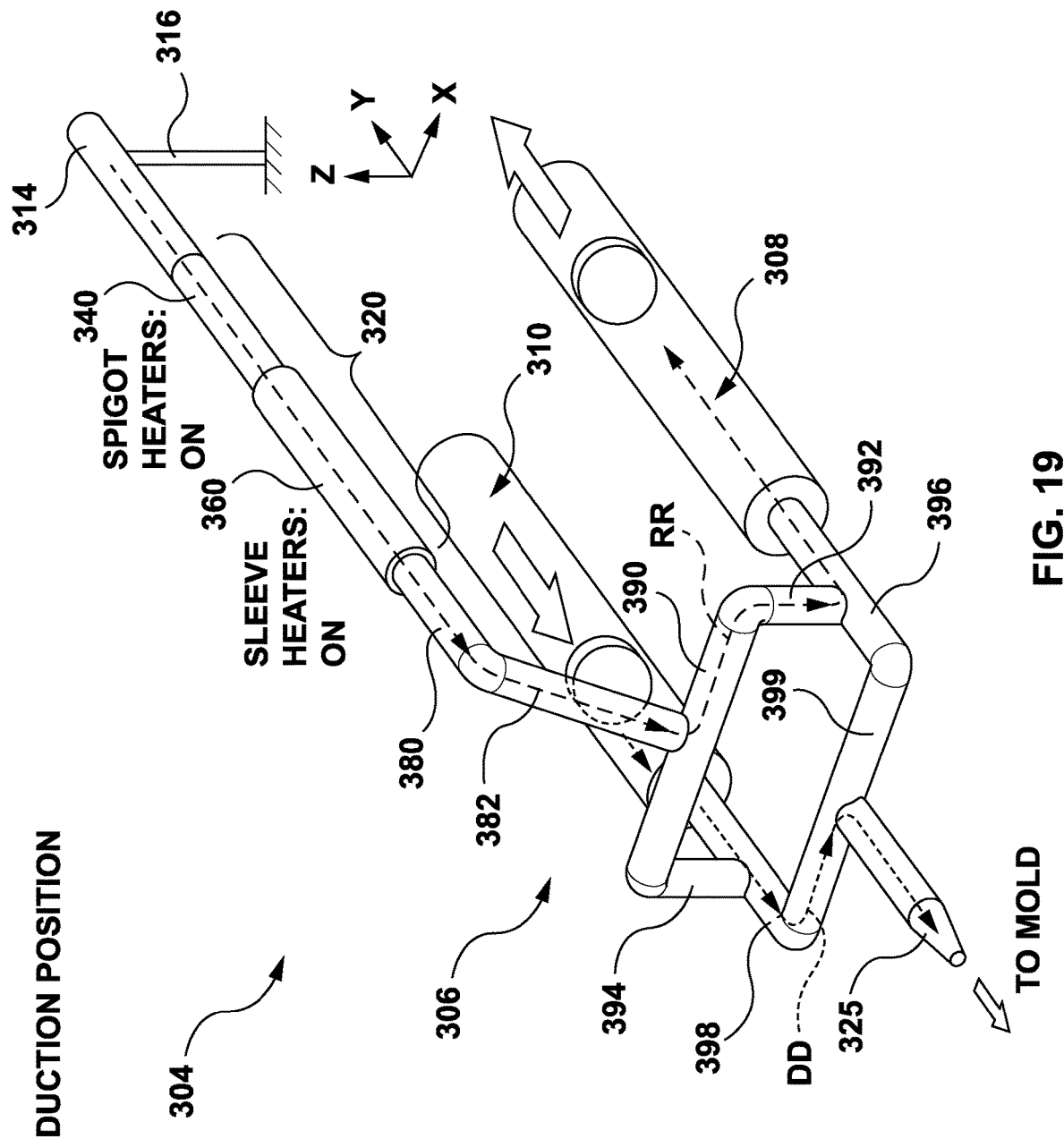
FIG. 19 schematically depicts melt flow through the melt paths of FIG. 18 when a first shooting pot of a dual shooting pot assembly of the injection unit is discharging melt and a second shooting pot of the dual shooting pot assembly is being refilled.
Figure 20:
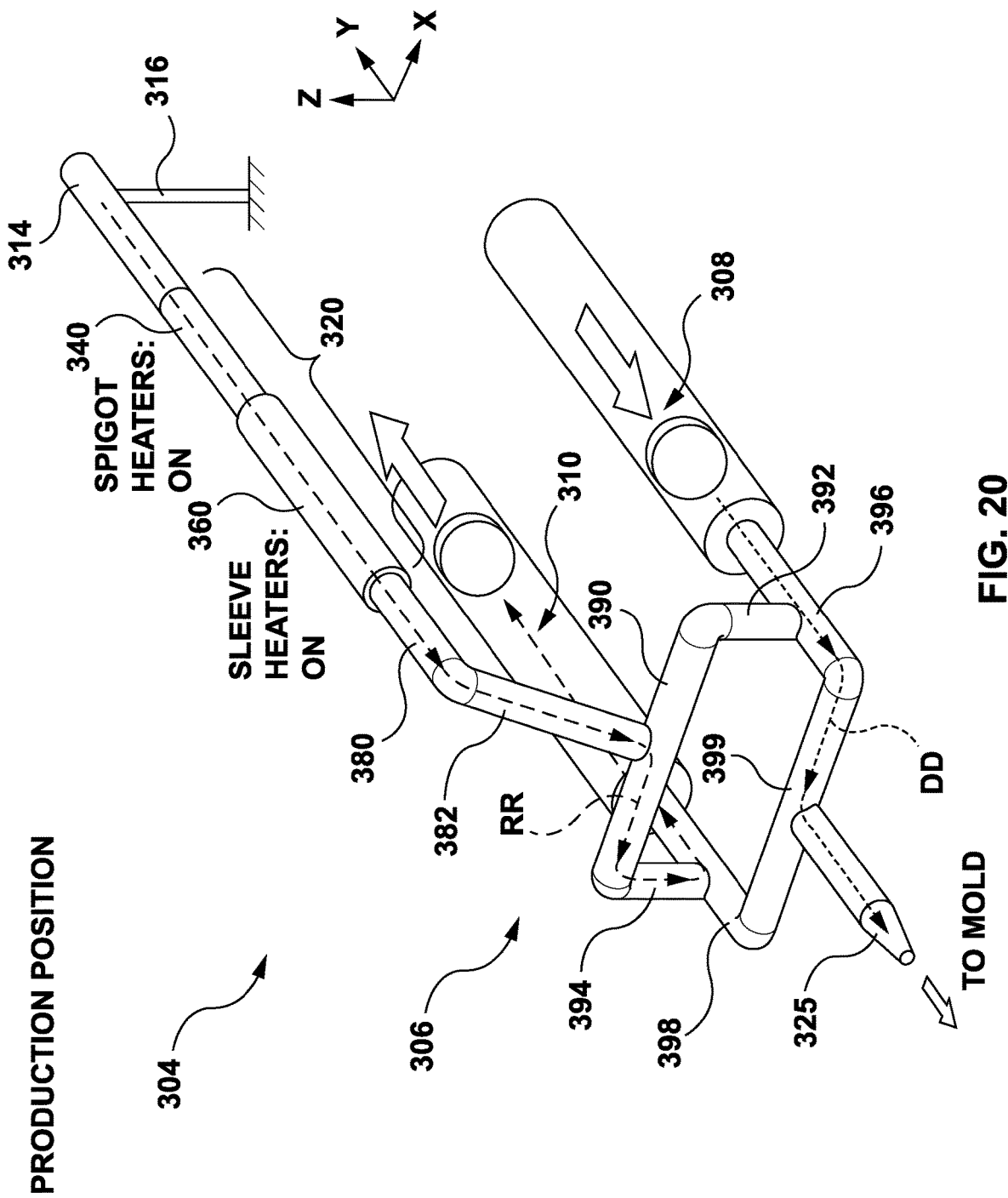
FIG. 20 schematically depicts melt flow through the melt paths of FIG. 18 at a later point in time when the first shooting pot is being refilled and the second shooting pot is discharging melt.

FIGS. 19 and 20 schematically depict the manner in which melt is dispensed from shooting pots 310 and 308 during normal production of molded articles, with the injection unit 304 in the production position as shown e.g. in FIG. 6. In that position, the nozzle 325 of the shooting pot assembly 306 engages the sprue bushing 335, forming a fluid melt connection therewith (see e.g. FIG. 6).

It will be appreciated that, when the telescopic melt coupling 320 is in the expanded production position of FIG. 19, the sleeve heaters 362 (FIG. 12) and the spigot heaters 342, 344, and 348 (FIGS. 9 and 13) will be on.

FIG. 19 depicts a first stage of the injection cycle. In this stage, the shooting pot 310 discharges previously accumulated melt into the mold via a melt path defined by axial melt conduit 398, lower transverse melt conduit 399, and nozzle 325. This flow is represented in FIG. 19 by dotted arrows DD. Meanwhile, the other shooting pot 308 is refilling with melt continuously supplied by the heated melt pipe 314 via a melt path defined by telescopic melt coupling 320, mixer 380, downwardly sloped melt conduit 382, upper transverse melt conduit 390, vertical melt conduit 392, and axial melt conduit 396. This flow is represented by dashed arrows RR. It will be appreciated that all of these melt paths are defined in part by suitable control, by controller 351, of distribution valves (not depicted) of dual shooting pot assembly 306.

In a subsequent stage of the injection cycle depicted in FIG. 20, the situation is reversed. Shooting pot 308 discharges previously accumulated melt into the mold via a melt path defined by axial melt conduit 396, lower transverse melt conduit 399, and nozzle 325, as represented by dotted arrows DD. Meanwhile, the other shooting pot 310 refills with melt continuously supplied by the heated melt pipe 314 via a melt path defined by telescopic melt coupling 320, mixer 380, downwardly sloped melt conduit 382, upper transverse melt conduit 390, vertical melt conduit 394, and axial melt conduit 398, as represented by dashed arrows RR.

Figure 21:
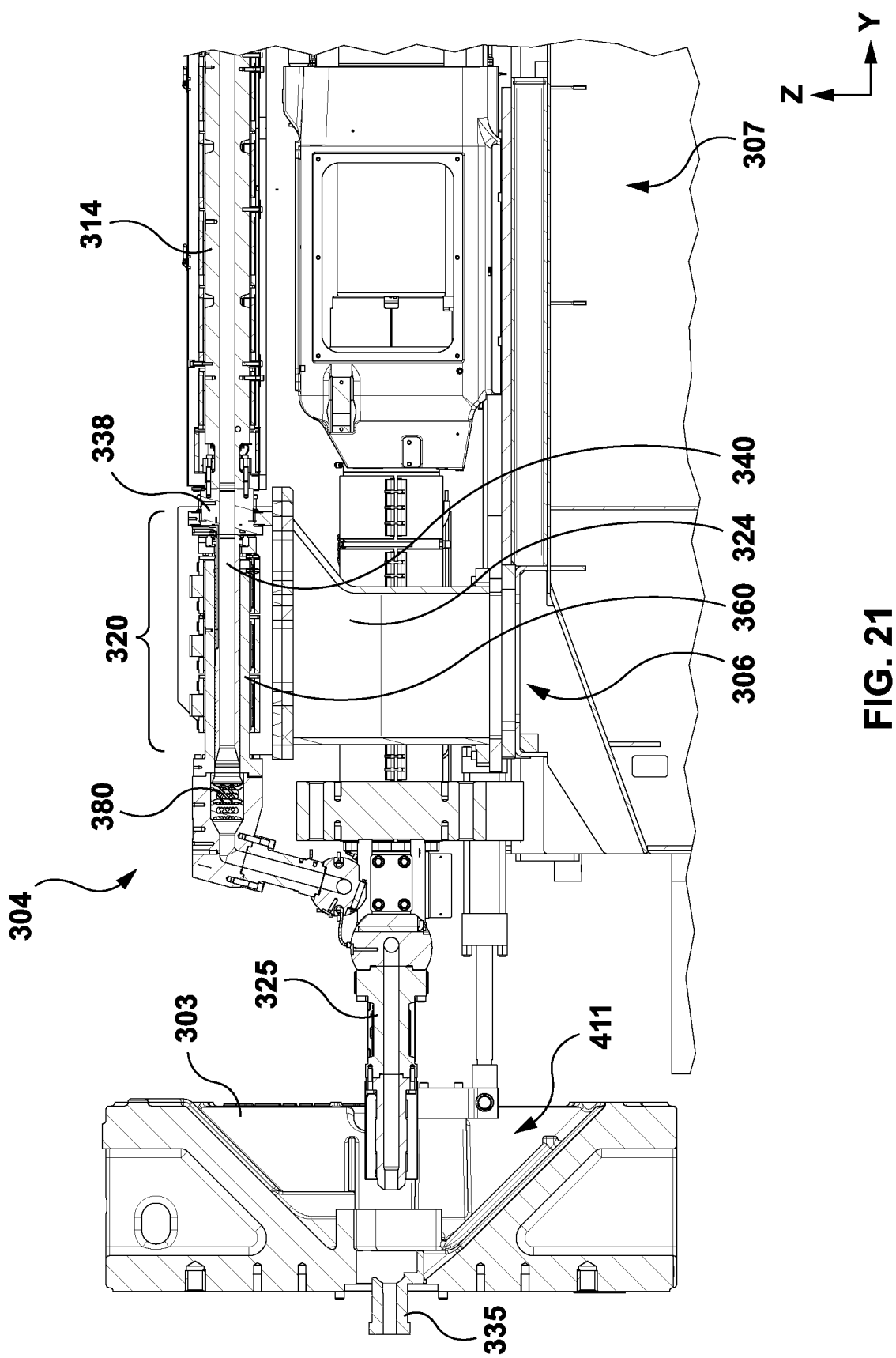
FIG. 21 is a longitudinal cross-section of a portion of the injection unit of FIG. 5 including a telescopic melt coupling when the injection unit is in the purging position.
Figure 22:
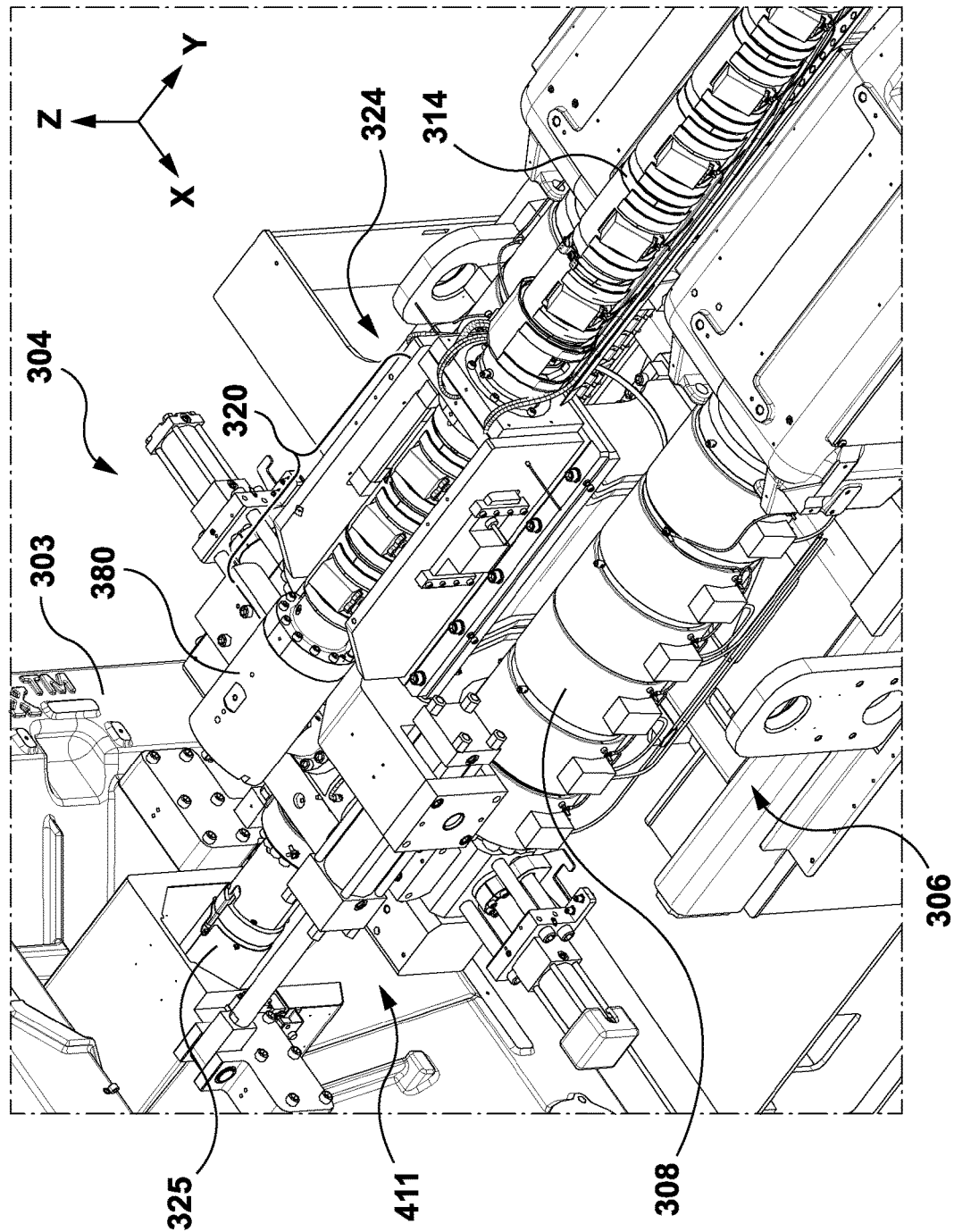
FIG. 22 is a top perspective view of the portion of the injection unit of FIG. 21 when the injection unit is in the purging position.

FIGS. 21 and 22 depict the injection unit 304 with the shooting pot assembly 306 in the purging position. More specifically, FIGS. 21 and 22 are a longitudinal cross-section and a top perspective view, respectively, of a portion of the injection unit 304 including the telescopic melt coupling 320 and nozzle 325.

When the shooting pot assembly 306 moves from the production position to the purging position, the nozzle 325 separates from the sprue bushing 335, thereby breaking the fluid melt connection between the two. The tip of the nozzle 325 may remain within an indentation 441 in an external face of the platen 303. Any melt discharged with the nozzle 325 in this position will not enter the hot runner 305.

Movement of the shooting pot assembly 306 into its purging position will cause the telescopic melt coupling 320 to collapse, i.e. the spigot 340 will become substantially nested with the sleeve 360. When the telescopic melt coupling 320 achieves its collapsed position, the spigot heaters 342, 344 and 348 are deactivated, e.g. under the control of controller 351. The rationale for the deactivation is that, with the sleeve 360 substantially overlapping the spigot 340, the sleeve heaters 362 will be sufficient for heating the spigot 340. As such, melt in the telescopic melt coupling 320 may be kept at the desired temperature without risking temperature overshoot from overlapping heaters. In some embodiments, only the infrared spigot heaters 342, 344 are deactivated when the telescopic melt coupling 320 collapses, with the cartridge heaters 348 remaining active. The collapsed position may be detected, e.g., by a position sensor of the injection unit 304.

Figure 23:
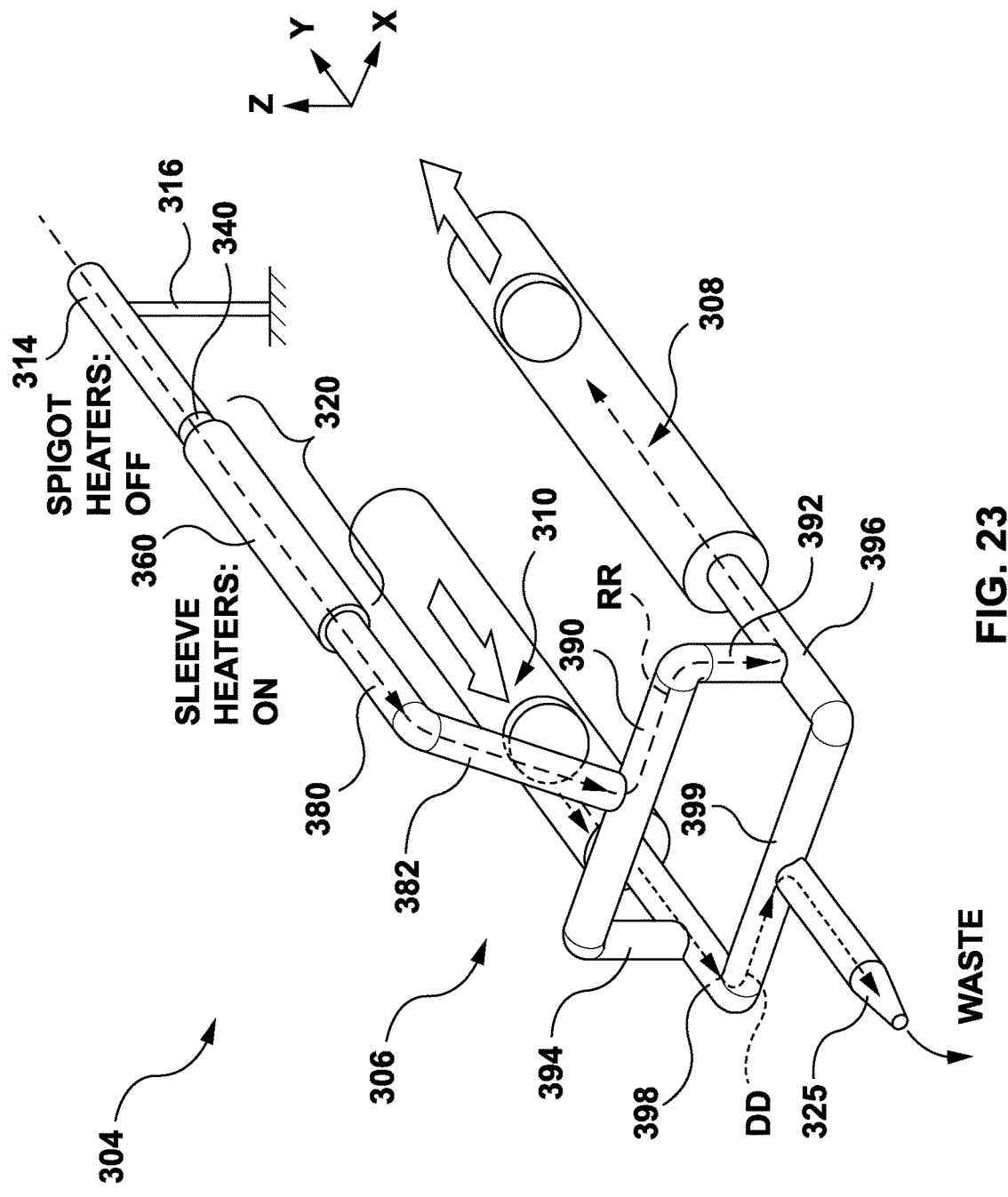
FIG. 23 is a simplified three-dimensional schematic diagram of melt flow paths defined within the injection unit of FIG. 5 when the injection unit is in the purging position, with the first shooting pot discharging melt and the second shooting pot being refilled.
Figure 24:
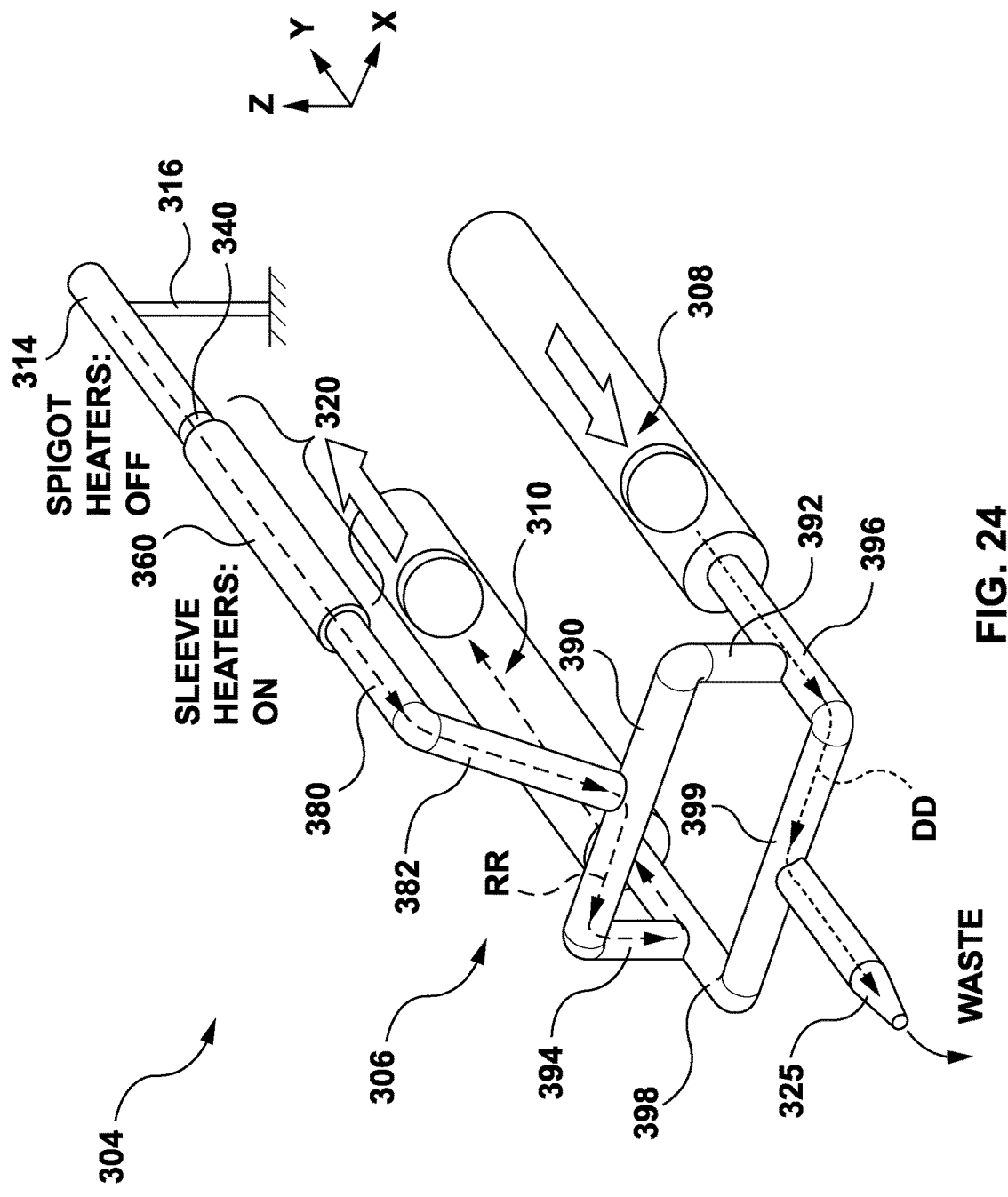
FIG. 24 schematically depicts melt flow through the melt paths of FIG. 23 at a later point in time when the first shooting pot is being refilled and the second shooting pot is discharging melt.

FIGS. 23 and 24 schematically depict the manner in which melt is dispensed from shooting pots 310 and 308 during purging of the injection unit 304, with the shooting pot assembly 306 in the purging position. Referring to FIG. 23, a first stage of the injection cycle is depicted. The operation of the shooting pot assembly 306 in this stage is the same as that shown in FIG. 19 above. An exception is that the melt flow DD discharged from nozzle 325 will fall as waste. FIG. 24 depicts a subsequent stage of the injection cycle. The operation of the shooting pot assembly 306 in this stage is the same as that shown in FIG. 20 above, with the melt flow DD discharged from nozzle 325 again falling as waste rather than being injected into the sprue bushing 335.

Various alternative embodiments are contemplated.

Although the above embodiments contemplate the use of recycled molding material for molding article, alternative embodiments could use virgin molding material in whole or in part.

The example telescopic melt coupling embodiment described above is utilized in conjunction with a shooting pot assembly having two shooting pots, i.e. a dual shooting pot assembly. It will be appreciated that the telescopic melt coupling could be used in alternative injection unit embodiments employing other types of shooting pot assemblies. For example, one alternative shooting pot assembly may have only a single shooting pot with an upstream buffer for buffering incoming melt as the shooting pot injects a shot of earlier accumulated melt into the sprue for molding a batch of articles.

In at least some of the above-described embodiments, when the telescopic melt coupling moves from the extended to the collapsed position, the spigot heaters are deactivated and the sleeve heaters remain active. It is possible that, in some embodiments, this could be reversed. That is, when the telescopic melt coupling moves from the extended to the collapsed position, the sleeve heaters could be deactivated and the spigot heaters could remain active.

Other modifications may be made within the scope of the following claims.

What is claimed is:

1. An injection unit for an injection molding machine having a hot runner with a sprue, the injection unit comprising:
a heated melt pipe configured to convey a continuous stream of melt;
a shooting pot assembly including at least one shooting pot, the shooting pot assembly configured to convert the continuous stream of melt from the heated melt pipe into batches for cyclical injection; and
a telescopic melt coupling configured to convey melt from the heated melt pipe to the shooting pot assembly;
wherein the telescopic melt coupling comprises:
a spigot; and
a sleeve slidable about the spigot between an extended position and a collapsed position while maintaining a seal with the spigot to substantially contain melt.

2. The injection unit of claim 1 further comprising:
at least one spigot heater configured to heat the spigot of the telescopic melt coupling; and
at least one sleeve heater configured to heat the sleeve of the telescopic melt coupling,
wherein the at least one spigot heater and the at least one sleeve heater are independently controlled.

3. The injection unit of claim 2 wherein the at least one spigot heater is operable to deactivate when the sleeve of the telescopic melt coupling transitions from the extended position to the collapsed position.

4. The injection unit of claim 2 further comprising a plurality of heaters for heating the heated melt pipe, wherein the plurality of heaters, the at least one spigot heater, and at least one sleeve heater are collectively operable to define a monotonically increasing temperature gradient along the heated melt pipe and the telescopic melt coupling in the downstream direction.

5. The injection unit of claim 4 wherein the monotonically increasing temperature gradient of the heated melt pipe and telescoping melt coupling is linear.

6. The injection unit of claim 4 wherein the monotonically increasing temperature gradient of the heated melt pipe and telescoping melt coupling is exponential.

7. The injection unit of claim 2 wherein the at least one spigot heater is selected from the group consisting of:
a cartridge heater embedded in the spigot; and
an infrared heater adjacent to the spigot.

8. The injection unit of claim 7 wherein the at least one spigot heater comprises a pair of infrared heaters on opposite sides of the spigot.

9. The injection unit of claim 7 wherein one of the cartridge heater and the infrared heater acts as a primary heater of the spigot and wherein the other of the cartridge heater and the infrared heater acts as a failsafe heater of the spigot configured to activate upon failure of the primary heater.

10. The injection unit of claim 1 wherein the telescopic melt coupling defines a spherical connection mating face conforming to a sphere centered along an axis of the telescopic melt coupling.

11. The injection unit of claim 10 wherein the spherical connection mating face is defined at an upstream end of the spigot and further comprising a stationary annular melt pipe coupler fluidly interconnecting the heated melt pipe with the spigot, the annular melt pipe coupler having a downstream end defining a spherical connection mating face that is complementary to the spherical connection mating face of the spigot, the two spherical connection mating faces collectively permitting angular axial misalignment of the telescopic melt coupling relative to the heated melt pipe without compromising the fluid melt interconnection.

12. The injection unit of claim 11 wherein the spigot has an annular flange extending radially from its upstream end and further comprising a lock ring attached to the annular melt pipe coupler, the lock ring defining an annular space in which the annular flange is contained to permit limited longitudinal movement of the spigot.

13. The injection unit of claim 12 further comprising a biasing element between the lock ring and the annular flange, the biasing element configured to bias the spherical connection mating face of the spigot against the spherical connection mating face of the annular melt pipe coupler.

14. The injection unit of claim 1 further comprising a static mixer between the telescopic melt coupling and the shooting pot assembly.

15. An injection molding machine comprising:
a hot runner with a sprue; and
an injection unit comprising:
a heated melt pipe configured to convey a continuous stream of melt;
a shooting pot assembly configured to convert the continuous stream of melt into batches for cyclical injection; and a telescopic melt coupling configured to convey melt from the heated melt pipe to the shooting pot assembly;

wherein the telescopic melt coupling comprises:
a spigot; and
a sleeve slidable about the spigot between an extended position and a collapsed position while maintaining a seal with the spigot to substantially contain melt.

16. The injection molding machine of claim 15 further comprising:
at least one spigot heater configured to heat the spigot of the telescopic melt coupling;
at least one sleeve heater configured to heat the sleeve of the telescopic melt coupling; and
a controller configured to deactivate either the at least one spigot heater or the at least one sleeve heater when the sleeve transitions from the extended position to the collapsed position.

17. The injection molding machine of claim 15 further comprising a spherical connection configured to permit angular axial misalignment of the telescopic melt coupling relative to the heated melt pipe without compromising the fluid melt interconnection between the heated melt pipe and the shooting pot assembly.

18. The injection unit of claim 1 wherein the shooting pot assembly being translatable between a sprue-engagement position and a sprue-disengagement position, and wherein the telescopic melt coupling has a variable length configured for maintaining a fluid melt interconnection between the heated melt pipe and the shooting pot assembly between the sprue-engagement position and the sprue-disengagement position.

19. The injection molding machine of claim 15 wherein the shooting pot assembly being translatable relative to the heated melt pipe between a sprue-engagement position and a sprue-disengagement position, wherein the telescopic melt coupling has a variable length configured for maintaining a fluid melt interconnection between the heated melt pipe and the shooting pot assembly between the sprue-engagement position and the sprue-disengagement position.

* * * * *